US011455302B2

(12) United States Patent
Dash et al.

(10) Patent No.: US 11,455,302 B2
(45) Date of Patent: Sep. 27, 2022

(54) DISTRIBUTED HISTOGRAM COMPUTATION FRAMEWORK USING DATA STREAM SKETCHES AND SAMPLES

(71) Applicant: Microsoft Technology Licensing, LLC, Redmond, WA (US)

(72) Inventors: Sumeet Priyadarshee Dash, Lake Forest, CA (US); Arnd Christian König, Kirkland, WA (US); Kabita Mahapatra, Redmond, WA (US); Dang Hai Pham, Seattle, WA (US); Ye Eun Park, Seattle, WA (US); Chi Yang, Bothell, WA (US); Mahadevan Sankara Subramanian, Aliso Viejo, CA (US); Cesar Alejandro Galindo-Legaria, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 109 days.

(21) Appl. No.: 17/007,801

(22) Filed: Aug. 31, 2020

(65) Prior Publication Data
US 2021/0357403 A1 Nov. 18, 2021

Related U.S. Application Data

(60) Provisional application No. 63/025,511, filed on May 15, 2020.

(51) Int. Cl.
*G06F 16/2453* (2019.01)
*G06F 16/2455* (2019.01)
(Continued)

(52) U.S. Cl.
CPC ...... *G06F 16/24532* (2019.01); *G06F 16/244* (2019.01); *G06F 16/2462* (2019.01); *G06F 16/24568* (2019.01)

(58) Field of Classification Search
CPC ............ G06F 16/24532; G06F 16/244; G06F 16/24568; G06F 16/2462; G06F 16/24545
(Continued)

(56) References Cited

U.S. PATENT DOCUMENTS 5,870,752 A * 2/1999 Gibbons ............. G06F 16/2358
707/999.102
6,477,523 B1 11/2002 Chiang
(Continued)

OTHER PUBLICATIONS

"International Search Report and Written Opinion Issued in PCT Application No. PCT/US2021/022022", dated Jun. 23, 2021, 11 Pages.
(Continued)

*Primary Examiner* — Michael Pham
(74) *Attorney, Agent, or Firm* — Fiala & Weaver P.L.L.C.

(57) ABSTRACT

Methods for distributed histogram computation in a framework utilizing data stream sketches and samples are performed by systems and devices. Distributions of large data sets are scanned once and processed by a computing pool, without sorting, to generate local sketches and value samples of each distribution. The local sketches and samples are utilized to construct local histograms on which cardinality estimates are obtained for query plan generation of distributed queries against distributions. Local statistics of distributions are also merged and consolidated to construct a global histogram representative of the entire data set. The global histogram is utilized to determine a cardinality estimation for query plan generation of incoming queries against the entire data set. The addition of new data to a data set or distribution involves a scan of the new data from
(Continued)

which new statistics are generated and then merged with existing statistics for a new global histogram.

20 Claims, 7 Drawing Sheets

(51) Int. Cl.
*G06F 16/242* (2019.01)
*G06F 16/2458* (2019.01)

(58) Field of Classification Search
USPC .......................................................... 707/718
See application file for complete search history.

(56) References Cited

U.S. PATENT DOCUMENTS

| | | | | |
|---|---|---|---|---|
| 6,865,567 | B1* | 3/2005 | Oommen | G06F 16/24542 |
| 9,189,520 | B2* | 11/2015 | May | G06F 16/24545 |
| 9,946,750 | B2* | 4/2018 | Cole | G06F 16/24542 |
| 2002/0026438 | A1 | 2/2002 | Rjaibi et al. | |
| 2004/0236762 | A1* | 11/2004 | Chaudhuri | G06F 16/24564 |
| 2008/0059125 | A1* | 3/2008 | Fraser | G06F 17/18 |
| | | | | 702/179 |
| 2008/0306903 | A1* | 12/2008 | Larson | G06F 16/2462 |
| 2018/0336075 | A1 | 11/2018 | Cairns | |

OTHER PUBLICATIONS

Agarwal, et al., "Mergeable Summaries", in Proceedings of the 31st ACM SIGMOD-SIGACT-SIGAI Symposium on Principles of Database Systems, May 21, 2012, pp. 23-34.

Chaudhuri, et al., "Effective Use of Block-Level Sampling in Statistics Estimation", in Proceedings of the ACM SIGMOD International Conference on Management of Data, Jun. 13, 2004, 12 Pages.

Cormode, et al., "An Improved Data Stream Summary: The Count-Min Sketch and its Applications", in Journal of Algorithms, vol. 55, Issue 1, Apr. 1, 2005, pp. 58-75.

Flajolet, et al., "Hyperloglog: The Analysis of a Near-Optimal Cardinality Estimation Algorithm", in Proceedings of the International Conference on Analysis of Algorithms, Jun. 17, 2007, pp. 127-146.

Ioannidis, Yannis, "The History of Histograms (abridged)", in Proceedings of 29th International Conference of Very Large Data Bases, Sep. 9, 2003, 12 Pages.

Poosala, et al., "Improved Histograms for Selectivity Estimation or Range Predicates", in Journal of ACM Sigmod Record, vol. 25, Issue 2, Jun. 1996, pp. 294-305.

Sanders, et al., "Efficient Parallel Random Sampling—Vectorized, Cache-Efficient, and Online", in Journal of ACM Transactions on Mathematical Software, vol. 44, Issue 3 Jan. 3, 2018, 14 Pages.

Vitter, et al., "Random Sampling with a Reservoir", in Journal ACM Transactions on Mathematical Software, vol. 11, Issue 1, Mar. 1985, 21 Pages.

* cited by examiner $$\overline{frq}(v) := \min_{j \in \{1,\ldots,d\}} count_{max}[j, h_j(v)].$$

DISTRIBUTED HISTOGRAM COMPUTATION FRAMEWORK USING DATA STREAM SKETCHES AND SAMPLES

CROSS-REFERENCE TO RELATED APPLICATION(S)

The present application claims priority to U.S. Provisional Patent Application No. 63/025,511, entitled "DISTRIBUTED HISTOGRAM COMPUTATION FRAMEWORK USING DATA STREAM SKETCHES AND SAMPLES," and filed on May 15, 2020, the entirety of which is incorporated by reference herein.

BACKGROUND

Histograms are used by query optimizers to estimate cardinality for generating efficient query plans in commercial database systems and data warehouses. Building these histograms involves capturing both the aggregate number of tuples and distinct values over ranges (corresponding to histogram buckets) as well as frequent tuple values, quantiles, and in some cases, frequency differences between adjacent values. One approach is to maintain a hash table of every value in a data set along with its frequency; however, the memory required is prohibitive for this approach for large data sets. Instead, histograms for large data sets are typically built by sorting the data, and processing the values in sorted order. Using this approach, quantiles are computed by tracking the total number of tuples observed, and it becomes trivial to track the most frequent values and to count the number of distinct values. Under this approach, the cost of constructing the histogram is dominated by reading and, in particular, sorting the data, which often involves an external memory sort for large tables. The use of a sort for the data during histogram creation implies that when scanning a multi-column table only a histogram for a single column is created. Depending on the number of columns and the table layout (i.e., columnar vs. row-based layout), this is a significant shortcoming.

Building a global histogram for a large, "sharded" data set has traditionally involved building a number of histograms over individual shards (or distributions) of the overall data set and then merging those histograms using custom merge algorithms. However, histogram-merge is a highly lossy process and, by merging, numerous key attributes of the underlying data distribution may be lost. Additionally, rescanning an entire table on a single computing node to produce the global histogram may not be viable as tables in data warehouses can be arbitrarily large.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for distributed histogram computation in a framework utilizing data stream sketches and samples are performed by systems and devices. Distributions of large data sets are scanned and processed by a computing pool, without sorting, to generate local sketches and value samples for each distribution. The local sketches and samples are utilized to construct local histograms on which cardinality estimates are obtained for generating query plans for the local steps of a distributed query that runs against the distributions. The local statistics of distributions are also merged and consolidated to construct a global histogram representative of the entire data set. The global histogram is utilized to derive cardinality estimates when producing the distributed plan for a query against the entire data set. The addition of new data to a data set or distribution thereof only involves a scan of the new data from which new statistics are generated and then merged with existing statistics for a new global histogram.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
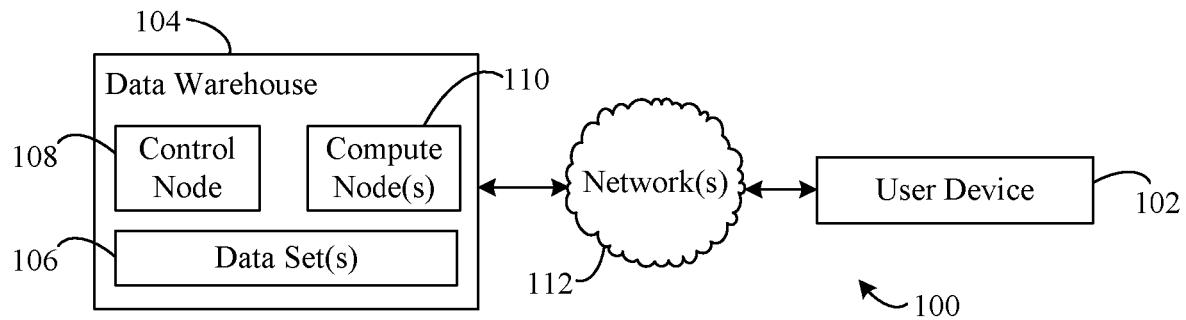
FIG. 1 shows a block diagram of a system for distributed histogram computation in a framework utilizing data stream sketches and samples, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

In the context of the embodiments herein, e.g., for relational databases, a "data set" is stored as a "table" of data, and these terms, "tables" and "data sets" may be used interchangeably in the description.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for distributed histogram computation in a framework utilizing data stream sketches and samples. Section III below describes example mobile and computing devices that may be used to implement features of the embodiments described herein. Section IV below describes additional examples and advantages, and Section V provides some concluding remarks.

II. Example Embodiments for Distributed Histogram Computation in a Framework Utilizing Data Stream Sketches and Samples Methods of distributed histogram computation in a framework utilizing data stream sketches and samples are performed by systems and devices. Various embodiments herein are directed to database systems and computing centers, which may be cloud-based, such as but not limited to, data warehouses, systems for "Big Data" analytics, enterprise systems, other database systems that store very large data sets, and/or the like. Described embodiments are applicable to any type of database server implementation, such as but not limited to, SQL Server® from Microsoft Corporation of Redmond, Wash.

In order to process queries against large data sets, a query optimizer in a database server relies on column-level statistics to generate efficient query plans. Statistics are generated for a column (or a set of columns) in a table either by explicitly running the statistics-generation commands or by the query optimizer internally if such an option is enabled on the database. A statistics object includes a histogram that represents the data distribution in the column(s) with which it is associated. Histograms approximate a one-dimensional data distribution T by partitioning it into bins (or buckets or cells) and storing the following information for each bin: the values forming the bin boundaries, the total number of tuples within the bin, and the number of distinct values within the bin. The query optimizer utilizes such histograms to estimate the cardinality of intermediate result-sets during the execution of a query. These cardinality estimates enable the query optimizer to produce high-quality query plans.

For reference, in describing the embodiments herein, given a data distribution (of a single column) over a value domain D, distributed histogram computation in a framework utilizing data stream sketches and samples allows for the construction of a histogram H using a single scan and limited memory. A data distribution, denoted as a multiset T, has values v occurring in T as $v \in T$. A set of values v in T may be denoted as $V=\{v_1, \ldots, v_l\}$. For a value $v \in D$, frq(v) is used to denote the number of occurrences of v in T; if $v \notin T$, then frq(v)=0.

As noted above, various embodiments are directed to analytics services built for enterprise data warehousing and "Big Data" analytics, such as but not limited to, Azure® Synapse from Microsoft Corporation of Redmond, Wash. Such analytics refer to various data warehousing, database server, and database manager features, and are contemplated as employing a cloud-first, highly scalable architecture to enable queries over petabytes of data quickly and efficiently. Embodiments include a control node acting as the query endpoint that is responsible for producing a distributed plan for an incoming query and dividing work among a pool of compute nodes (also "processing nodes" hereinafter). Each compute node is responsible for processing data from one or more distributions, i.e., portions or distributions of a data set, of a large distributed table. The control node transforms an incoming query into a set of queries and each such query may be run against each distribution in parallel in dependency order. Each node, including control and compute nodes, in the embodiments described is configured to run/execute its own instance of a database server.

In this context, column-level statistics include both a local and a global component in the end-to-end lifecycle of a distributed request in a data warehouse or other database implementation. At the global level (e.g., on the control node), a histogram representing the data distribution in the column(s) of the entire table is needed, and the database server instance at the control node uses the global histograms to optimize queries for parallel processing. On each compute node, a histogram representative of data in the distribution(s) mapped to a particular compute node is needed for processing on the respective distribution(s).

Traditional global histogram construction involves building Max-Diff histograms on each compute node and then merging those histograms using custom merge algorithms on the control node. However, as noted above, histogram-merge operations are highly lossy, and numerous key attributes of the underlying data distributions are lost during this process. Additionally, rescanning and sorting entire tables on a single node to produce the global histograms is resource-prohibitive as tables in data warehouses can be arbitrarily large.

Accordingly, embodiments herein describe a process for the computation of global and local histograms that involves scanning the entire data set just once which can be performed in parallel across large numbers of compute nodes. Moreover, the embodiments described scale easily as more compute nodes and/or data are added, and the global histogram is constructed by merging statistical summaries (described below) without loss of information. That is, the statistics utilized in embodiments are incrementally mergeable where the union of the statistics built separately on two data sets has equivalent accuracy to similar statistics built on the union of the two data sets. The embodiments herein also provide that no computation that has already happened is redone, in part or full, and that histograms are constructed without performing a sort of the data set, which is a resource-intensive operation, especially for large data sets, even when sampling is used.

Given that histograms represent an approximation of the data distribution seen within a table, and to avoid large sorting overhead associated with prior solutions, embodiments provide for constructing histograms based on statistical summaries of a large table which are obtained at significantly less overhead. For instance, obtaining a fully random row-level sample is significantly faster, as no sort of a large data set is required and histograms over multiple columns can be built using a single scan over the data. Further, embodiments include generating and storing statistical summaries, including specialized sketches such as Count-Min sketches and HyperLogLog sketches, to detect "heavy hitters," or values that make up a significant fraction of the overall data set, and the number of distinct values in the data set in order to estimate these quantities more accurately than possible using a random sample of the data alone. Moreover, these statistical summaries are mergeable in that a summary for a union of two data sets can be computed from two separate summaries that are computed on each individual data set (or distribution thereof), while still giving identical error guarantees, relative to summary size, as if the resulting summary had been computed from scratch on the union of the two sets. In other words, when more data is added to a table (e.g., a new partition or distribution is brought online), the statistical summaries for the entire data set can be kept up-to-date by only scanning the new data and subsequently merging the resulting statistical summaries with the statistical summaries previously computed for the older data.

Therefore, the embodiments provide for computation of histograms that does not use a sort of the underlying data—rather only a scan—saving processing and memory resources as well as avoiding issues like overruns of temporary database memory/storage that may occur when sorting large data sets. And, because the summary statistics computed when scanning the data set are mergeable, they can be incrementally updated when new data is added while only scanning the added data, further increasing processing and memory usage efficiency. This provides very significant savings in the context of databases that are append-only. Additionally, the described framework is applicable to various types of histograms, including but without limitation, equi-width, equi-depth, end-biased, etc., and is not limited to one specific histogram type.

Accordingly, the embodiments herein provide for solutions to issues with constructing histograms for data sets, including very large data sets, through distributed histogram computation in a framework utilizing data stream sketches and samples. These and other embodiments will be described in further detail below in this Section, in association with the Figures, and in Sections/Subsections that follow.

Systems, devices, and apparatuses may be configured in various ways for distributed histogram computation in a framework utilizing data stream sketches and samples. For instance, FIG. 1 will now be described. FIG. 1 shows a block diagram of a system 100 that is configured for distributed histogram computation in a framework utilizing data stream sketches and samples, according to example embodiments.

As shown in FIG. 1, system 100 includes a user device 102 and a data warehouse 104. In embodiments, user device 102 and data warehouse 104 communicate with each other over a network 112. It should be noted that in various embodiments different numbers of user devices and/or data warehouses are present. Additionally, according to embodiments, any combination of the systems and/or components illustrated in FIG. 1 are present in system 100.

Network 112 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for interacting with a database, data warehouse, and/or database server, such as providing queries against data sets that are processed via distributed histogram computation in a framework utilizing data stream sketches and samples. User device 102 also includes additional components (not shown for brevity and illustrative clarity) including, but not limited to, components and subcomponents of other devices and/or systems herein, in embodiments.

Data warehouse 104 comprises one or more server computers, computing systems, and/or computing devices, which may include one or more distributed or "cloud-based" servers in embodiments, as described in further detail below. In embodiments, data warehouse 104 comprises one or more on-premises servers in addition to, or in lieu of, cloud-based servers. Various systems/devices herein, such as data warehouse 104, are configured to provide services utilized by user device 102, such as business services and/or applications involving data warehousing, database hosting, and/or like. For instance, data warehouse 104 includes a control node 108, one or more compute nodes 110 ("compute nodes 110" hereinafter), and one or more data sets 106 ("data sets 106" hereinafter) configured to perform functions for such services/applications, as described in further detail herein.

Data sets 106 include databases and/or the like, in embodiments, which may be very large data sets such as for "Big Data" analytics and/or data warehousing. It is contemplated herein that one or more of data sets 106 are to the order of petabytes, or more, in embodiments. Data sets 106 may include any type of data, including relational data, organized as tables having columns for the data.

Control node 108 comprises one or more server computers, server systems, and/or computing devices, such as an on-premises server(s) in addition to, or in lieu of, cloud-based servers. Control node 108, as noted above, includes an instance of a database server application, as described below. Control node 108 is configured to act as the query endpoint for incoming queries, to produce a distributed plan for an incoming query based on distributed histogram computation in a framework utilizing data stream sketches and samples, and to divide work for query processing among compute nodes 110. That is, according to embodiments, control node 108 is configured to transform an incoming query into a set of queries that are run against each distribution of a data set in parallel via compute nodes 110.

Compute nodes 110 each comprise one or more server computers, server systems, and/or computing devices, such as an on-premises server(s) in addition to, or in lieu of, cloud-based servers. Compute nodes 110, as noted above, include an instance of a database server application, as described below. Compute nodes 110 are configured to process data from one or more distributions of large tables in performance of query execution tasks as distributed by control node 108. In embodiments, compute nodes 110 are configured to perform such tasks for distributed histogram computation in a framework utilizing data stream sketches and samples, as described herein.

As noted above, data warehouse 104 includes one or more distributed or "cloud-based" servers, in embodiments. That is, data warehouse 104 may be a network, or "cloud," implementation for applications and/or services associated with hosting databases and/or data warehousing in a network architecture/cloud platform. A cloud platform includes a networked set of computing resources, including servers, routers, etc., that are configurable, shareable, provide data security, and are accessible over a network such as the Internet, according to embodiments. Cloud applications/services for hosting databases and/or data warehousing are configured to run on these computing resources, often atop operating systems that run on the resources, for entities that access the applications/services, locally and/or over the network. A cloud platform is configured to support multi-tenancy as noted above, where cloud platform-based software services multiple tenants, with each tenant including one or more users who share common access to certain software services and applications of the cloud platform, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

While a data warehouse (data warehouse 104) is shown in system 100 for non-limiting purposes of description and illustration, in various embodiments, alternate implementations for database hosting are also contemplated herein.

Figure 2:
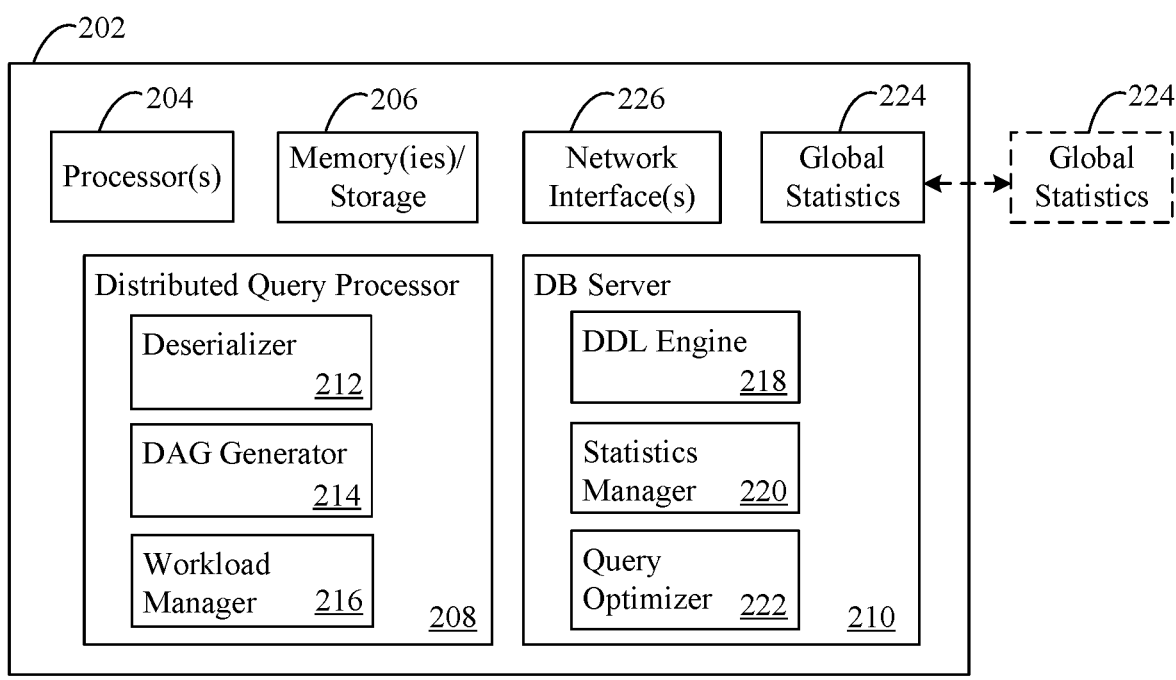
FIG. 2 shows a block diagram of a computing system for distributed histogram computation in a framework utilizing data stream sketches and samples, according to an example embodiment.

Referring now to FIG. 2, a block diagram of a system 200 is shown for distributed histogram computation in a framework utilizing data stream sketches and samples, according to an example embodiment. System 200 as exemplarily illustrated and described is configured to be an embodiment of control node 108 in data warehouse 104 of system 100 in FIG. 1. That is, system 200 is illustrated as being configured to perform operations of a control node. System 200 is described as follows.

System 200 includes a computing system 202 which is any type of server or computing system, as mentioned elsewhere herein, or as otherwise known, including without limitation cloud-based systems, on-premises servers, distributed network architectures, portions of a data warehouse, and/or the like. As shown in FIG. 2, computing system 202 includes one or more processors ("processor") 204, one or more of a memory and/or other physical storage device ("memory") 206, as well as one or more network interfaces ("network interface") 222. Computing system 202 also includes distributed query processor 208 and a database server application 210 ("DB server 210" hereinafter).

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache(s), temporary database memory, etc., for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of distributed query processor 208 and/or DB server 210, including one or more of the components thereof as described herein, which may be implemented as computer program instructions, as described herein.

Memory 206 includes volatile storage portions such as a random access memory (RAM) and/or persistent storage portions such as hard drives, non-volatile RAM, and/or the like, to store or be configured to store computer program instructions/code for distributed histogram computation in a framework utilizing data stream sketches and samples as described herein, as well as to store other information and data described in this disclosure including, without limitation, statistical summaries, sketches, samplings, counts, histograms, stores thereof, global versions thereof, and/or the like, in different embodiments. For instance, computing system 202 also includes global statistics 224 which may be stored in memory 206, which may comprise global histograms, row counts, and/or the like, for data sets that are generated according to the embodiments herein, and which are used to estimate cardinalities by query optimizer 222. In embodiments, global statistics 224 may be stored in a storage external to computing system 202, and may be available for sharing/use by other systems (e.g., multiple pools of compute/processing nodes, as described herein, etc.). Memory 206 also includes storage of data sets such as data sets 106 of FIG. 1, in some embodiments, while in other embodiments data sets are stored in external storage systems accessible via a network interface.

Network interface 226 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100 in FIG. 1, including systems that store data sets, user devices, compute nodes, and/or the like, over a network such as network 112.

System 200 also includes additional components (not shown for brevity and illustrative clarity) including, but not limited to, components and subcomponents of other devices and/or systems herein, as well as those described below with respect to FIG. 9, according to embodiments.

Distributed query processor 208 includes a deserializer 212, a Directed Acyclic Graph (DAG) generator 214, and a workload manager 216, in embodiments. Distributed query processor 208 is configured to orchestrate a query task DAG across large numbers, e.g., thousands, of compute nodes at petabyte-scale reliably and is configured to provide implicit fault-tolerance guarantees. Deserializer 212 is configured to deserialize requests for distributed query statistics processing/computation on data set distributions, received from DB server 210, and provide its output to DAG generator 214 which in turn is configured to generate a DAG, such as a static DAG that outlines process dependencies and operations for performing distributed statistics computation in a framework utilizing data stream sketches and samples. DAGs are provided from DAG generator 214 to workload manager 216 which is configured to assign compute nodes, as further described below, to perform the distributed statistics computation.

DB server 210 is any database server application, and DB server 210 includes a data definition language (DDL) engine 218 and a statistics manager 220, in embodiments. DDL engine 218 is configured to execute statements to create, modify, and delete tables, indexes, and relationships in a data set, e.g., based on an incoming query. In embodiments, DDL engine 218 is configured to execute statements to create, modify, and/or delete tables, lists, arrays, and/or other data structures that organize statistical summaries, sketches, samplings of data sets, row counts, etc., that are generated in performance of the functions herein for distributed histogram computation in a framework utilizing data stream sketches and samples.

Statistics manager 220 is configured to generate requests for performance of distributed statistics computation and provide such requests to distributed query processor 208, and also to receive results, e.g., success/failure indications, global histograms, etc., returned from task processing by compute nodes. In some embodiments, requests for performance of distributed statistics computation are generated based on commands or requests therefor received by statistics manager 220, while in other embodiments, as portion of a control node, statistics manager 220 of DB server 210 is configured to generate requests for performance of distributed statistics computation periodically, when there is a creation of or a change to a data set, when a query is received for a data set on which performance of distributed statistics computation has not yet been performed, and/or the like. In embodiments, statistics manager 220 may comprise a portion of DDL engine 218.

Query optimizer 222 is configured to generate query plans for execution of incoming queries against data sets based at least on the incoming queries and cardinality estimates generated from global statistics 224, e.g., global histograms. Query optimizer 222 is also configured to subsequently optimize query plans, globally and/or locally, based on updated statistics, in embodiments. For instance, when a new distribution of a data set is brought online, updated global and/or local histograms may be constructed, and query optimizer 222 may be configured to utilize these updated histograms to optimize newly-generated query plans or to optimize new queries.

In some embodiments, distributed query processor 208 and DB server 210 may be implemented in different physical or logical server hosts that are communicably linked for performance of distributed histogram computation in a framework utilizing data stream sketches and samples. In such embodiments, distributed query processor 208 may comprise a separate server node while DB server 210 comprises a control node, as described herein.

Figure 3:
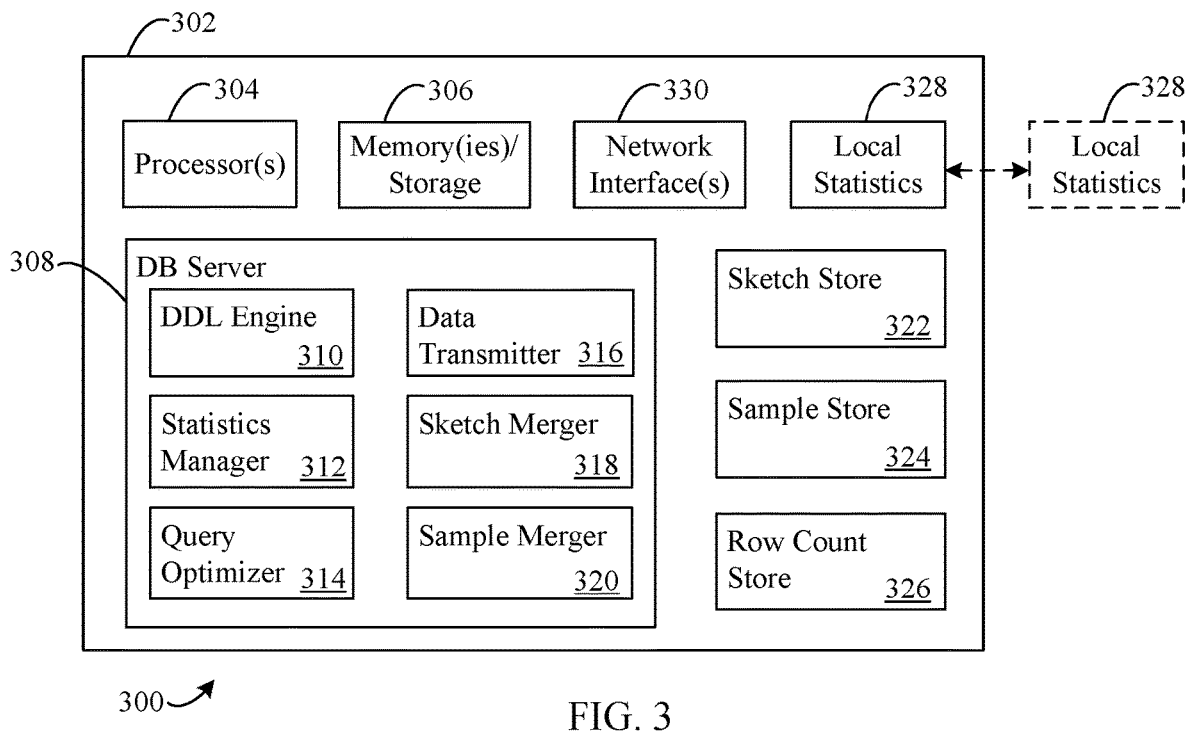
FIG. 3 shows a block diagram of a computing system for distributed histogram computation in a framework utilizing data stream sketches and samples, in accordance with an example embodiment.

In FIG. 3, a block diagram of a system 300 is shown for distributed histogram computation in a framework utilizing data stream sketches and samples, according to an example embodiment. System 300 as exemplarily illustrated and described is configured to be an embodiment of one of compute nodes 110 in data warehouse 104 of system 100 in FIG. 1. That is, system 300 is illustrated as being configured to perform operations of a compute node. System 300 is described as follows.

System 300 includes a computing system 302 which is any type of server or computing system, as mentioned elsewhere herein, or as otherwise known, including without limitation cloud-based systems, on-premises servers, distributed network architectures, portions of a data warehouse, and/or the like. As shown in FIG. 3, computing system 302 includes one or more processors ("processor") 204, one or more of a memory and/or other physical storage device ("memory") 206, as well as one or more network interfaces ("network interface") 222. Computing system 202 also includes a database server application 308 ("DB server 308" hereinafter).

Processor 304 and memory 306 may respectively be any type of processor circuit(s)/system(s) and memory that is described herein, and/or as would be understood by a person of skill in the relevant art(s) having the benefit of this disclosure, and may be similarly configured as processor 204 and memory 206 described above with respect to FIG. 2. Processor 304 may comprise circuitry that is configured to execute computer program instructions such as, but not limited to, embodiments of DB server 308, including one or more of the components thereof as described herein, which may be implemented as computer program instructions, as described herein. Memory 306 stores or is configured to store computer program instructions/code for distributed histogram computation in a framework utilizing data stream sketches and samples as described herein, as well as to store other information and data described in this disclosure including, without limitation, statistical summaries, sketches, samplings, counts, histograms, stores thereof, local versions thereof, and/or the like, in different embodiments.

For instance, computing system 302 also includes local statistics 328 which may be stored in memory 306, which may comprise local histograms and/or the like, for data sets that are generated according to the embodiments herein, and which are used to estimate cardinalities used by a query optimizer 314 for the generation of query plans. In embodiments, local statistics 328 may be stored in a storage external to computing system 302, and may be available for sharing/use by other systems (e.g., multiple pools of compute/processing nodes, as described herein, etc.). In the illustrated embodiment, a sketch store 322, a sample store 324, and a row count store 326 are also maintained or persisted by computing system 302, e.g., in memory 306. In embodiments, sketch store 322, sample store 324, and/or row count store 326 comprise data structures, such as lists, tables, arrays, and/or the like, that store their respective, associated data (e.g., Count-Min sketches, HyperLogLog sketches, and random data set value samples), described in further detail below.

Network interface 330 may be any type or number of wired and/or wireless network adapter, modem, etc., configured similarly as network interface 226 of system 200 in FIG. 2, enabling system 300 and computing system 302, to communicate intra-system with components thereof, as well as with other devices and/or systems over a network, such as are shown in system 100 in FIG. 1.

System 300 also includes additional components (not shown for brevity and illustrative clarity) including, but not limited to, components and subcomponents of other devices and/or systems herein, as well as those described below with respect to FIG. 9, according to embodiments.

DB server 308 is any database server application, and DB server 308 includes a DDL engine 310, a statistics manager 312, and query optimizer 314 in embodiments. DDL engine 310 is configured to similarly as DDL engine 218 in FIG. 2, in embodiments. DDL engine 310 is also configured to receive distributed queries and distributed statistics computations, or distributed query statistics processing tasks, from a distributed query processor as described above for system 200 of FIG. 2. In embodiments, distributed query statistics processing tasks are performed for distributed histogram computation in a framework utilizing data stream sketches and samples. Query optimizer 314 is configured to generate query plans for execution of incoming queries, e.g., distributed queries, against data sets, or distributions thereof, based at least on the incoming queries and cardinality estimates generated from local statistics 328, e.g., local histograms. Query optimizer 314 is also configured to subsequently optimize query plans, e.g., locally, based on updated statistics, in embodiments. For instance, when a new distribution of a data set is brought online or an existing distribution is added to, updated local histograms may be constructed, and query optimizer 314 may be configured to utilize these updated histograms to optimize existing query plans.

Statistics manager 312 is configured to generate requests/commands for performance of distributed statistics computation, and distributed query statistics processing tasks as a compute node, e.g., as received from distributed query processor 208 of FIG. 2. In embodiments, statistics manager 312 may comprise a portion of DDL engine 310. Statistics manager 312 is configured to initiate and/or perform operations to generate sketches and samplings associated with data sets, or distributions thereof, which are used to generate local histograms stored as local statistics 328, as described in further detail below.

As illustrated, and in the context of a compute node, DB server 308 of computing device 302 includes a data transmitter 316, a sketch merger 318, and a sample merger 320. Data transmitter 316 is configured to broadcast a row count for a distribution(s) of a data set that is processed by computing device 302 for distributed statistics computation. This broadcast is provided to each other compute node that is assigned by a control node to perform distributed statistics computation to be utilized in sample merging operations, and is persisted in row count store 326. Data transmitter 316 is also configured to provide sketches, such as Count-Min and HyperLogLog sketches, from each compute node to a single compute node for consolidation prior to merging. Sketch merger 318 is configured to merge sketches generated via statistics manager 312 for computing device 302 as well as from each other compute node assigned to distributed statistics computation for distributions of a data set by a distributed query processor. Sketches such as Count-Min and HyperLogLog sketches are consolidated in sketch store 322, in embodiments. Sample merger 320 is configured to merge samples in sample store 324 collected for computing device 302 and for each other compute node. In some embodiments, sketches, samples, and/or row counts described herein may be stored in the same store, e.g., as columns in a single table, such that sketch store 322, sample store 324, and/or row count store 326 comprise a single store with multiple columns, or are configured as any combination of these stores. Additionally, in some embodiments, one type of data, e.g., a row count, may be stored as a column in another store type, e.g., sketch store 322.

In embodiments, a distributed query processor such as distributed query processor 208 of system 200 in FIG. 2 (e.g., in a control node) is also configured to assign a single compute node as illustrated for system 300 as a designated compute node to perform merging of sketches and merging of samples. Accordingly, each other compute node in a pool of compute nodes assigned for distributed statistics computation for distributions of a data set are configured to provide their respective sketches and samples to the designated compute node for these operations, e.g., via data transmitter 316.

Figure 4:
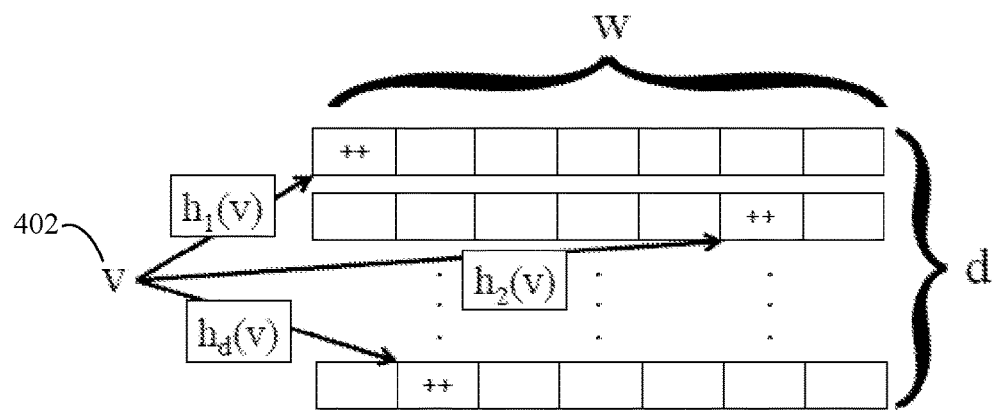
FIG. 4 shows a data structure for distributed histogram computation in a framework utilizing data stream sketches and samples, in accordance with an example embodiment.

Turning now to FIG. 4, a data structure 400 for distributed histogram computation in a framework utilizing data stream sketches and samples, according to an example embodiment. Data structure 400 is illustrated as a structure for organizing data related to a Count-Min sketch. A Count-Min sketch comprises a random mapping of the space of all values in the underlying data domain, e.g., a distribution, to 'd' cells in the Count-Min sketch such that all subsequent data operations are deterministic based on this fixed mapping. Given this random mapping, data structure 400 is shown as a frequency table or two-dimensional array of counters having width 'w' and depth 'd': $count_{max}[1; 1] \ldots count_{max}[d; w]$ that is utilized with a random sample of values from a data set or distribution to identify the "heavy-hitters," which in statistics is a value in a data set that repeats with a very high frequency. For instance, for each value, a lookup is performed for the estimated frequency of a given value in the Count-Min sketch, and the values that exceed a certain threshold are identified as "heavy-hitters." While this procedure may identify false positives, no false negatives will be found. In addition, a number 'd' of hash functions $h_1, \ldots, h_d: D \rightarrow \{1, \ldots, .w\}$ are chosen uniformly at random from a 2-universal hash family. In embodiments, the sketch-counters are initialized to 0, and when scanning data in a data set or distribution, for each value 402, satisfying $v \in T$ as seen during the scan, an iteration is performed over all hash functions $h_i(v)_{i=1 \ldots d}$ and $counter_{max}[i, h_i(v)]$ is increased by 1. Once initialized, a Count-Min sketch can then be used to estimate the frequency of a value v as shown in Equation 1:

$$\overline{frq}(v) := \min_{j \in \{1, \ldots, d\}} count_{max}[j, h_j(v)]. \quad \text{Eq. 1}$$

It should also be noted here that two Count-Min sketches from two different data sets or distributions can be merged to identify the heavy-hitters in the merged data set or distribution, and the statistical guarantees, relative to the structure size, are identical to determining a single Count-Min sketch on the union of the underlying data sets.

Figure 5:
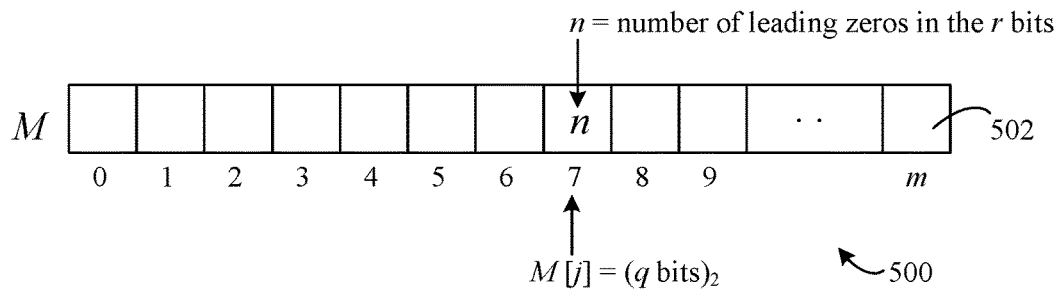
FIG. 5 shows a data structure for distributed histogram computation in a framework utilizing data stream sketches and samples, in accordance with an example embodiment.

FIG. 5 shows a data structure 500 for distributed histogram computation in a framework utilizing data stream sketches and samples, according to an example embodiment. Data structure 500 is illustrated as a structure for organizing data related to a HyperLogLog (HLL) sketch. An HLL sketch comprises probabilistic data, and data structure 500 is shown as being generated by scanning the data in a data set once. The HLL sketch represented in data structure 500 is utilized to find an approximate number DV of distinct values |V| in a dataset with a high degree of accuracy. Put another way, the HLL sketch provides an observation of the cardinality of a data set or distribution having uniformly distributed random numbers. This is estimated by calculating the maximum number of leading zeros in the binary representation of each number in the set. If the maximum number of leading zeros observed is n, an estimate for the number of distinct elements in the set is $2^n$. HLL sketches utilize a hash function that is applied to each element in the original data set or distribution to obtain uniformly distributed random numbers with the same cardinality as the original data set or distribution. The cardinality of this randomly distributed set can then be estimated. In HLL sketches, the variance is minimized by splitting the multiset of uniformly distributed random numbers into numerous subsets, calculating the maximum number of leading zeros in the numbers in each of these subsets, and using a harmonic mean to combine these estimates for each subset into an estimate of the cardinality of the whole set. The generation of HLL sketches comprises three main operations: an add operation to add a new element to the set, a count operation to obtain the cardinality of the set, and a merge operation to obtain the union of two sets. The data of the HLL sketch is illustrated for data structure 500 in FIG. 5 as being stored in an array M of counters or registers 502 with size m that are set to 0 in their initial state.

The add operation includes computing the hash of the input data value v with a hash function h, getting the first q bits (e.g., q is $\log_2(m)$), and to obtain the address of the register to modify. With the remaining r bits of the value, $\rho(w)$ is computed which returns the position of the leftmost '1' in the r bits, i.e., how many leading zeros are in the r bits plus 1. The new value of the register is then set to the maximum between the current value of the register and $\rho(w)$ shown here in Equation 2:

$$x := h_j(v);$$

$$j := 1 + \langle x_1, \ldots, x_b \rangle_2;$$

$$w := x_{q+1}, x_{q+2}, \ldots;$$

$$M[j] := \max(M[j], \rho(w)) \qquad \text{Eq. 2}$$

The count operation includes computing the harmonic mean of the m registers 502, and using a constant to derive an estimate E of the count as in Equation 3:

$$Z = \left( \sum_{j=1}^{m} 2^{-M[j]} \right)^{-1};$$

$$\alpha_m = \left( m \int_0^\infty \left( \log_2 \left( \frac{(2+u)}{(1+u)} \right) \right)^m du \right)^{-1};$$

$$E = \alpha_m m^2 Z_i.$$

where if n is the cardinality sought for M, each subset $M_j$ will have n/m elements, and $\max_{x \in M_j} \rho(x)$ is a close approximation of $\log_2(n/m)$, represented as 'B'. The harmonic mean of $2^B$ is mZ which should be near n/m. Thus, $m^2Z$ should be n approximately. The constant $\alpha_m$ is then introduced to correct systematic multiplicative bias present in $m^2Z$ due to hash collisions. In embodiments, an approximation of $\alpha_m$ may be obtained based on the value of m, and in some embodiments with very large cardinalities, it is contemplated that linear counting may be used when $$E < \frac{5}{2} m,$$

or when cardinality approaches the limit of the size of registers 502 as $$E^* = -2^{32} \log \left( 1 - \frac{E}{2^{32}} \right).$$

The merge operation for HLLs, $(HLL_1, HLL_2)$, includes determining the maximum for each pair of registers 502, j:1 ... m, as $HLL_{union}[j] = \max(HLL_1[j], HLL_2[j])$. It should also be noted here that two HLL sketches from two different data sets or distributions can be merged to determine how many distinct values are present in the merged data set or distribution, and the statistical guarantees, relative to the structure size, are identical to determining a single HLL sketch on the union of the underlying data sets.

Figure 6:
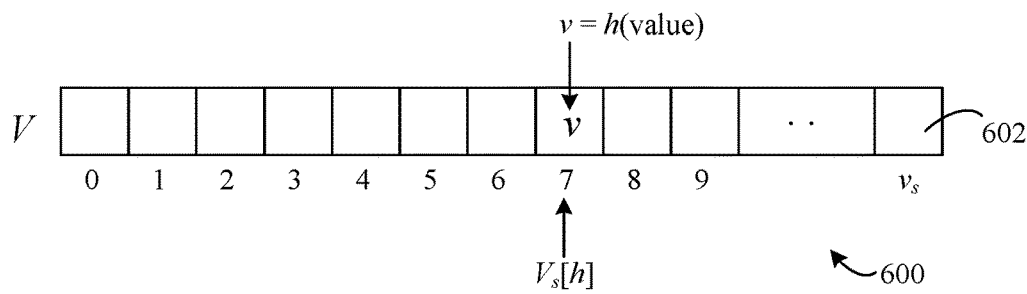
FIG. 6 shows a data structure for distributed histogram computation in a framework utilizing data stream sketches and samples, in accordance with an example embodiment.

FIG. 6 shows a data structure 600 for distributed histogram computation in a framework utilizing data stream sketches and samples, according to an example embodiment. Data structure 600 is illustrated as a structure for organizing data related to a sampling of values of a data set or distribution. Data structure 600 is illustrated as being a table, list, array, or the like, V having a size S, i.e., there are S number of entries 602 stored by data structure 600. The size S may be any value appropriate for design considerations and/or for achieving an accurate sample representation of the data set or distribution. In embodiments, S may be, or may approximately be, 100 k tuples of a distribution of a large data set. When the size S of the data set and/or distribution is known, a Bernoulli Sampling method is used, in embodiments, and when S is not known, a Reservoir Sampling method is used, in other embodiments. In cases where a data set is distributed, samples from each distribution are collected in parallel threads, independently, and merged to form a single, global sample.

In some embodiments, a random number, chosen uniformly at random, and associated with each of the data set/distribution values is used for sampling. In one example where S is 100 k, the data set/distribution values associated with the lowest 100 k random numbers (or the highest, etc., in different embodiments) may be selected and stored for data structure 600, thus achieving a random, uniform sampling of data set/distribution values.

As noted herein, embodiments are directed to distributed histogram computation in a framework utilizing data stream sketches and samples. For example, from a Count-Min sketch, an HLL sketch, and a random sample, as described above, statistics manager 312 is configured to generate a histogram for a data set or a distribution thereof. That is, using a single scan over a data set or distribution, statistical summaries are sufficient to subsequently compute the histograms, based on these summaries alone. When more data is added (e.g., a new partition or distribution is brought online), only the new data is scanned and then subsequently the resulting statistical summaries are merged with the ones already computed. In such an approach, the underlying statistical summaries have to be mergeable, i.e., a statistical summary $S(D, \in)$ is computed, which summarizes a data set or distribution D with an error-guarantee E from any two summaries $S(D_1, \in)$ and $S(D_2, \in)$ where S D1 ⊍ D2=D, with ⊍ denoting the multiset union.

In embodiments, as previously noted, the underlying statistical summaries used are Count-Min sketches to compute "heavy hitters" or very high frequency values, HLL sketches to estimate the number of distinct values, and uniform random samples which are used to estimate quantiles. While MaxDiff(V,F) histograms utilize knowledge of the maximum difference in frequency between adjacent values to determine bin boundaries of histograms, the embodiments herein instead change the type of histogram partitioning technique used to a variant of end-biased histograms, which maintain the k most frequent values in T in singleton (i.e., one-value) bins which can be approximated well using a combination of the samples and Count-Min sketches, and also partitioning the remaining value range for a histogram using an equi-depth partitioning. Equi-depth partitioning utilizes computing quantiles, which are approximated using the uniform random samples described herein. That is, embodiments provide for a statistics manager to generate histograms that are a combination of end-biased and equi-depth histograms, where values that make up more than a fraction θ of a data set or distribution T are kept in their own singleton bin of the histogram, and remaining values are partitioned via equi-depth partitioning into bins, as the statistical aggregates needed for construction of such histograms are estimated with high accuracy using the statistical summaries computed when scanning the data a single time.

Construction of histograms based on samples and statistical summaries (e.g., sketches) as described herein, is performed as follows in embodiments. Determining singleton bins for very-high-frequency values includes determining the very-high-frequency, or "heavy-hitter" values themselves along with their frequencies. Additionally, to partition the remaining bins, the quantile distribution over the remaining data set or distribution is computed after very-high-frequency values have been removed from consideration, and then, for every non-singleton bin, the total tuples contained therein are computed, as well as the number of distinct values contained in each non-singleton bin.

Determining all values v ∈ V for T that are very-high-frequency values (i.e., values v where $$frq(v) = \theta \cdot |T| \text{ for a given } \theta \leq 1,$$

e.g., $$\theta = \frac{1}{10000}),$$

an iteration over all distinct values v is performed in S, and an evaluation is performed as to whether $\overline{frq}(v) \geq \theta \cdot |T|$ using a generated Count-Min sketch-based estimate. Because of the property of Count-Min sketches that $\overline{frq}(v) > frq(v)$ for all values v, this ensures that this test succeeds for all very-high-frequency ("heavy-hitter") values. The set of all heavy-hitter values found in this way is denoted by H. It should be noted that in order to ensure that all heavy-hitter values are represented in S at least once, the sample size for an associated data set or distribution is chosen to be sufficiently large. For example, $|S|=\theta^{-1} \cdot 10$ ensures that every heavy-hitter value is contained in S at least once with probability greater than 99.99%. For every heavy-hitter v found, a histogram bin is constructed containing v alone, i.e., a singleton bin, and $\overline{frq}(v)$ is used to estimate the number of tuples in the bin, and because it is a singleton bin, the bin contains one distinct value. The number of heavy-hitters found in this manner is denoted as $h_h$.

To partitioning the remaining values in an equi-depth manner into m histogram buckets, embodiments provide for first removing all values corresponding to heavy-hitters from the sample S, and denoting the resulting sample by S'. Next, the total number of tuples in S' is estimated by $$n = |T| \cdot \frac{|S'|}{|S|}.$$

The quantiles in the S' are utilized to estimate the m corresponding quantiles in the entire data distribution and bin boundaries are placed at the quantile values. The total number of tuples in a bin is estimated as $$\frac{n}{m},$$

and the number of distinct values in a given bin b is estimated by counting the number of distinct values in S' that fall into b and scaling this estimate up by $$\frac{DV - h}{|S'|}.$$

Thus, a histogram from which an accurate cardinality estimate can be derived is generated, according to the described embodiments.

Figure 7:
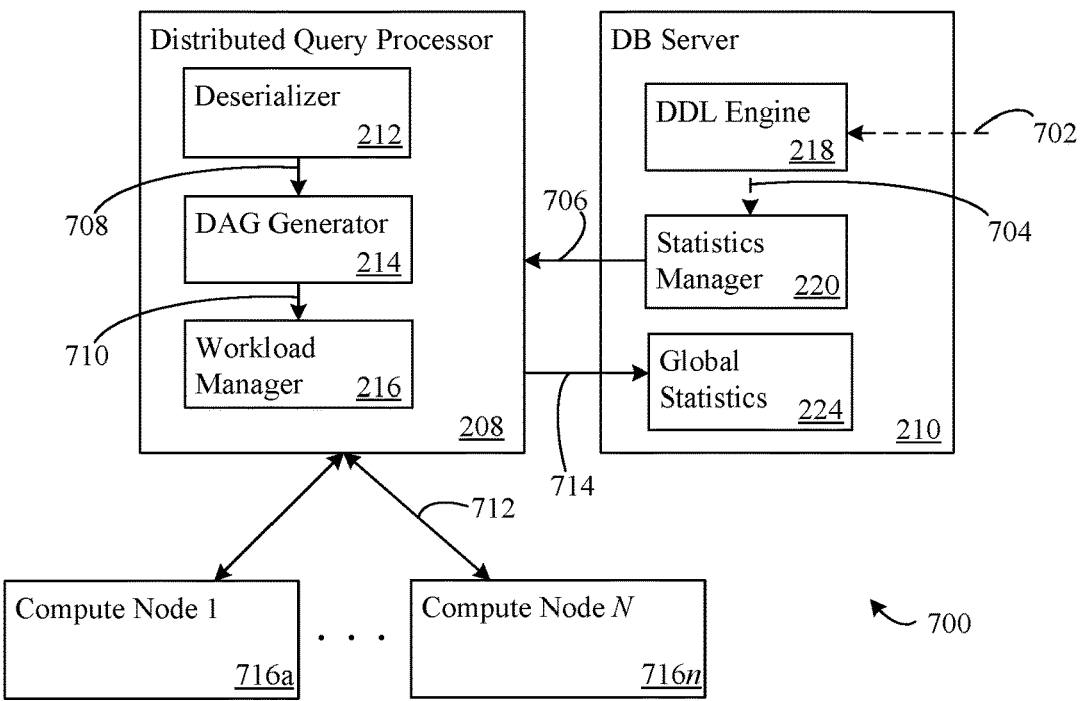
FIG. 7 shows a system flow diagram for distributed histogram computation in a framework utilizing data stream sketches and samples, in accordance with an example embodiment.
Figure 8:
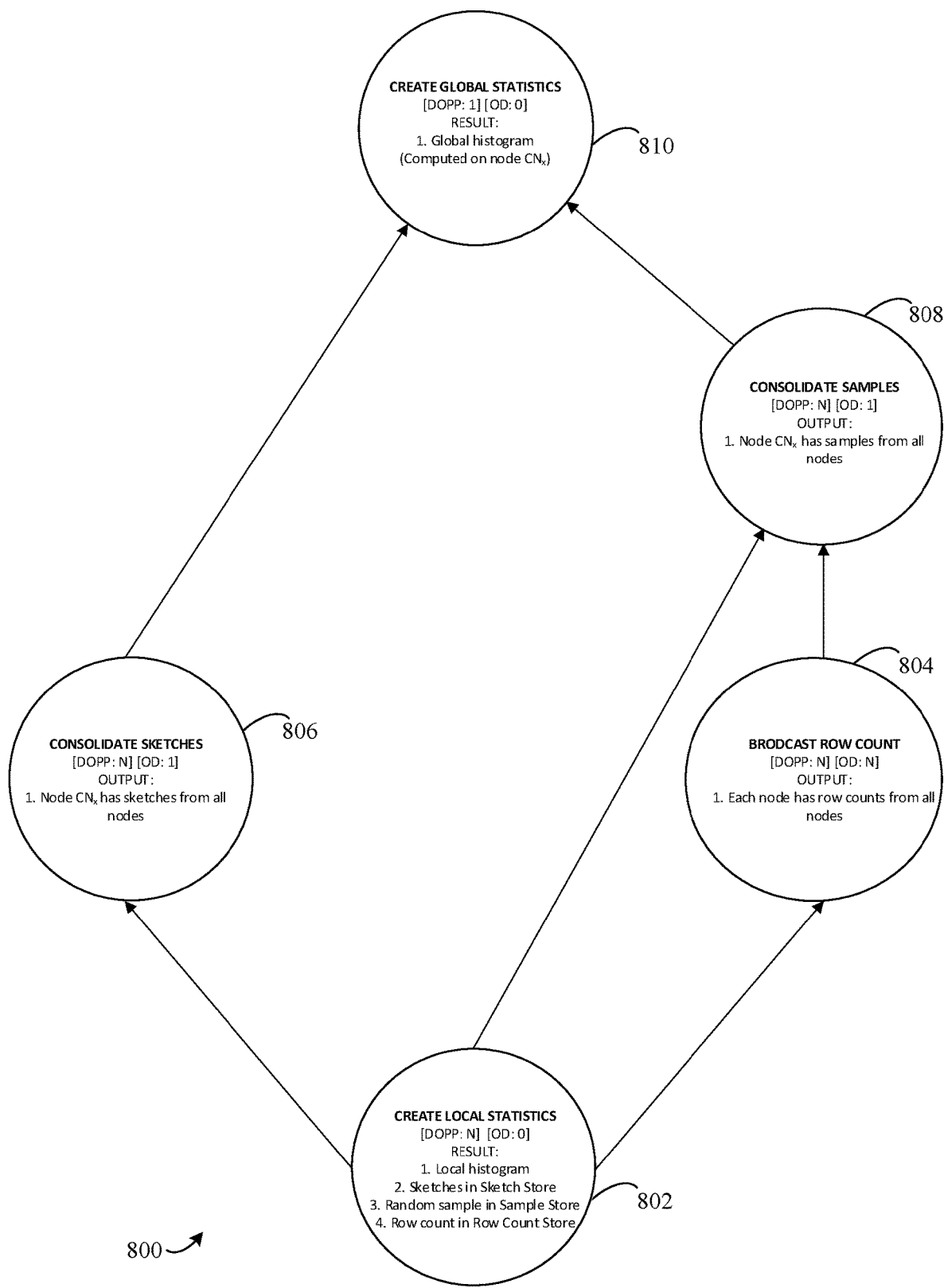
FIG. 8 shows a flow diagram distributed histogram computation in a framework utilizing data stream sketches and samples, in accordance with an example embodiment.

FIG. 7 and FIG. 8 will now be described. FIG. 7 shows a system flow diagram 700, and FIG. 8 shows a flow diagram 800, for distributed histogram computation in a framework utilizing data stream sketches and samples, according to example embodiments.

System flow diagram 700 of FIG. 7 is an embodiment of system 200 of FIG. 2 and system 300 of FIG. 3. System flow diagram 700 as exemplarily illustrated and described is configured to be an embodiment of a control node, represented by distributed query processor 208 and DB server 210, and of compute nodes, represented by compute node 716a to compute node 716n (embodiments of computing device 302 of FIG. 3). That is, system flow diagram 700 is illustrated as being configured to perform operations of a control node and one or more compute nodes. System flow diagram 700 is described as follows.

System flow diagram 700 exemplarily illustrates the lifecycle of a statistics request starting at a control node. As noted herein, distributed statistics computation for columns of data in a data set or distribution may be initiated based on incoming queries or commands to initiate such tasks. In step 702, an incoming query or command is received by DDL engine 218 of DB server 210. DDL engine 218 is configured to provide a command or task initiation indication to statistics manager 220 of DB server 210 in step 704 to begin distributed statistics computation. In some embodiments, statistics manager 220 is configured to initialize distributed statistics computation, as also described herein.

In either scenario, statistics manager 220 provides a request for statistics in step 706 to distributed query processor 208 which is configured to orchestrate a query task DAG across any number compute nodes in a pool at petabyte-scale reliably and to provide implicit fault-tolerance guarantees. The request provided in step 706 includes information enabling distributed query processor 208 to create and/or cause creation of, the desired statistics, based on a static DAG generation framework, including without limitation, the name of the table, the column on which statistics are to be generated, the number of distributions in the table, and/or the like.

Distributed query processor 208 is configured to transform a statistics creation request into a query task DAG and execute it. Deserializer 212 is configured to deserialize the request in step 706 into a representation suitable for input to DAG generator 214, and the representation is provided in step 708. DAG generator 214 generates a DAG, e.g., a static DAG, which outlines process dependencies and operations for performing distributed query statistics processing tasks by compute node 716a to compute node 716n. In step 710, the DAG generated by DAG generator 214 is provided to workload manager 216. Workload manager 216 is configured to manage the execution of the vertexes in the query task DAG in order of dependencies across compute node 716a to compute node 716n. Workload manager 216 is also configured to assign one compute node as the designated node that will perform merges and consolidations of sketches and samples generated by each compute node in the pool. The distributed portions of the task-graph assigned by workload manager are based on the DAG, in embodiments, and include one or more portions that are performed in parallel by compute node 716a to compute node 716n. In step 712, the distributed portions of the task are provided to compute node 716a to compute node 716n, and resulting statistics are persisted.

Referring now to FIG. 8, flow diagram 800 represents an embodiment of the DAG generated by DAG generator 214. Flow diagram 800 is also an embodiment of step 714 of system flow diagram 700.

As noted, the distributed workflow to compute column statistics in embodiments is structured as a DAG of operators or tasks. Each vertex of the DAG encapsulates work or processing performed on one or more compute nodes while the edges capture precedence constraints including dataflow dependencies. A vertex can also be thought of as a task that runs on one or more compute nodes. The number of compute nodes on which a vertex is scheduled is governed by the degree of partitioned parallelism (DOPP) of the vertex, in embodiments. The output degree (OD) of a vertex identifies how many compute nodes receive the information generated during the execution of the vertex on a single compute node. Flow diagram 800 is described as follows.

Flow diagram 800 includes a number of vertices, which are described in dependency order. A vertex 802 represents the first task performed by compute node 716a to compute node 716n of FIG. 7. Vertex 802 is responsible for creating local statistics across compute node 716a to compute node 716n, e.g., Count-Min and HLL sketches, value samples, and row counts for each compute node. The statistics generated on each compute node are representative of the data in the distributions that are mapped to each particular node (i.e., local), and these statistics are utilized as described herein to generate a local histogram associated with respective distributions. The Count-Min and HLL sketches, and the row counts, computed in the process of generating local histograms, are persisted in a local sketch store and a local row count store, e.g., sketch store 322 and row count store 326 of system 300 (a compute node), and the random sample of values in a sample store, e.g., sample store 324. In embodiments, these stores are local tables created in a temporary memory database space of the respective compute nodes. Local histograms generated are stored in a local statistics store, such as local statistics 328. The local histograms are then later deployed to a query optimizer, e.g., query optimizer 314 of system 300, which is configured to utilize the local histogram, at each compute node, to estimate cardinality in the generation of query plans for distributed tasks of incoming queries against distributions of the data set. The degree of partitioned parallelism (DOPP) of vertex 802 is N, meaning that this task runs on all compute nodes: compute node 716a to compute node 716n in parallel. The OD of vertex 802 is 0, meaning there is no data transfer among the compute nodes. In embodiments, each other vertex of flow diagram 800 are dependent on the completion of the task performed at vertex 802.

From vertex 802, flow diagram 800 proceeds to a vertex 804 and to a vertex 806, but not to a vertex 808 as this vertex is dependent on completion of tasks performed in vertex 804. For vertex 804, each compute node (compute node 716a to compute node 716n) transmits, or broadcasts, the row count column in its local store to each other compute node, e.g., via data transmitter 316 of system 300. That is, the values for each compute node are written to a local row count store on each other node in vertex 804. When summed together, the combined row counts provide the total size D of the distributed table for the data set. Vertex 804 thus allows each compute node to independently derive the value of D. The consolidated row count information is stored in a row count store, in embodiments, and is used by sample merger 320 when merging samples as described herein, and is also utilized for histogram build operations as described below and further herein. The DOPP of this vertex is N, as is the OD.

In vertex 806, sketches are consolidated at a single compute node, e.g., via data transmitter 316, and in embodiments, the consolidated sketches are then merged at the single compute node, e.g., via sketch merger 318 of system 300. All the rows from the sketch stores across all compute nodes (compute node 716a to compute node 716n) are consolidated in a global sketch store (which may be a local table that is part of the sketch store of a single compute node, e.g., the compute node designated by workload manager 216). The designated compute node may be chosen randomly to perform the task of computing the final, global histogram. The global sketch store has the same schema as any local sketch store, in embodiments, but contains the union of all rows in all local sketch stores of compute node 716a to compute node 716n.

One property of the statistical summaries maintained during a scan of a data set or distribution is that they are mergeable, as noted above. This property is leveraged when data is added to an existing data set, distribution, table, etc. That is, only summary statistics on the new data are built. These new summary statistics are subsequently merged with the existing summary statistics, as opposed to re-scanning the entire data set. Concretely, merging the different summaries uses the following steps. Count-Min sketches may be generated having the same depths d and having respective widths w that are multiples of each other, thus, the merged Count-Min sketch is determined by summing up the counters in cells with identical indexes. For HLL sketches, these summaries are generated with the same number of bits for determining the internal bucketing, as well as identical hash functions, in embodiments, and thus the merged HLL sketch is computed by storing, in each bucket, the maximum counter among buckets with the same index in the HLL sketches that are merged.

Vertex 806 can be scheduled in parallel with the vertex 804. The DOPP of vertex 806 is N while the OD is 1 (i.e., to the designated compute node).

On completion of the task at vertex 804, flow diagram 800 continues to vertex 808. In vertex 808, samples of values from the distributions are consolidated, e.g., via data transmitter 316, and in embodiments, the consolidated samples are then merged at a single compute node, e.g., via sample merger 320 of system 300. When scheduled, in vertex 808 each of the compute nodes transmit sampled values from their associated distributions to a global sample store created on the designated compute node, as similarly described for vertex 806. In embodiments, a statistically generated (e.g., randomly) set of less than all sampled values may be provided by each processing node for consolidation, or all sample values may be provided by each processing node. In embodiments, the consolidated row counts in a row count store (performed in vertex 804) can be used to determine the extent of filtering at source. The global sample store may be a portion of sample store 324 in system 300. Accordingly, each of compute node 716a to compute node 716n has a random sample of size $S_i$ which it has constructed by scanning a dataset of size D. The probability of each value appearing in this sample is $S_i/D_i$. Upon executing vertex 808, a global sample of size S is generated on the designated compute node which accepts elements with a probability of S/D, where $D=\Sigma_{i=0}^{N}Di$.

Bernoulli samples (over distinct partitions of the data) are merged by re-sampling all tuples in the samples at the corresponding rates, according to embodiments. For example, to merge samples S1 and S2, which have been sampled at rate $\alpha_1$ and $\alpha_2$, respectively, into a Bernoulli sample S with sampling rate $\alpha$ (with $\alpha \leq \min\{\alpha_1, \alpha_2\}$), sampling from S1 at rate $r_1=\alpha/\alpha 1$ and, correspondingly, sample from S2 at rate $r_2=\alpha/\alpha 2$, is performed, and followed by taking the union of the results. If there are many samples to be merged, and the sizes of the underlying data sets, distributions, tables, etc., are initially known, it becomes possible to generate the number of samples coming from each of the merged samples using random variables drawn from the corresponding probability distributions. This prior knowledge speeds up the merge process considerably, as only the corresponding number of values (at random) from each sample need to be selected.

Reservoir samples are merged by associating each tuple with a random number between [0, 1], during the initial reservoir sampling process, according to embodiments. For each sample thus taken, the tuples associated with the sampling number (e.g., 100 k) of smallest values are retained. Merging is then accomplished by retaining the sampling number of tuples associated with the smallest values across all reservoir samples.

The DOPP of vertex 808 is N and the OD is 1 (to the designated compute node).

On completion of the tasks performed at vertex 806 and vertex 808, flow diagram continues to a vertex 810. This final vertex is scheduled on the designated compute node. In vertex 808, merging of consolidated sketches and consolidated samples may be performed, in embodiments, instead of at vertex 806 and vertex 808 (according to vertex 810 having a DOPP of 1). Additionally, in vertex 808, a histogram build algorithm is run, as described herein, over the global sample and sketch stores to produce the final, global histogram that represents the data distributions in the entire table in the data set. The DOPP of vertex 810 is 1, and its OD is 0.

Referring back now to FIG. 7 and system flow diagram 700, step 712 completes with the storage/persisting of the local statistics, global statistics, global histogram, etc. at a local store of one or more processing nodes (e.g., in local statistics 328) which may be retrieved by distributed query processor 208 from the ones of compute node 716a to compute node 716n. In step 714, the global histogram/statistics is/are retrieved by and provided from distributed query processor 208 to DB server 210 for storage in global statistics 224 in association with the data set on which the statistical tasks were performed—in embodiments, DB server 210 may retrieve the global histogram/statistics directly. The global histogram is then later deployed to a query optimizer, e.g., query optimizer 222 of system 200, which is configured to utilize the global histogram to estimate cardinality in the generation of query plans for incoming queries against the data set. In embodiments, other pools of compute nodes in addition to compute node 716a to compute node 716n, and/or other control nodes are also enabled for access to any stored/persisted local and/or global histogram/statistics.

In embodiments, performance of tasks for vertices with ODs greater than zero, e.g., ODs of 1, may be accomplished using data shuffling capabilities of DB server instances running on compute nodes to move data between such nodes. That is, embodiments provide for the ability of any compute node to transmit relational data to DB Server instances executing on any other compute node.

Additionally, row count data collected on each node is deleted at the end of the workflows described for system flow diagram 700 and/or flow diagram 800, in embodiments. Likewise, sketches and samples collected during the processes described above are also deleted, in some embodiments, while in others sketches and samples are persisted for future use to enable incremental statistics maintenance when new data is added to a data set, a distribution, a table, etc.

Figure 9:
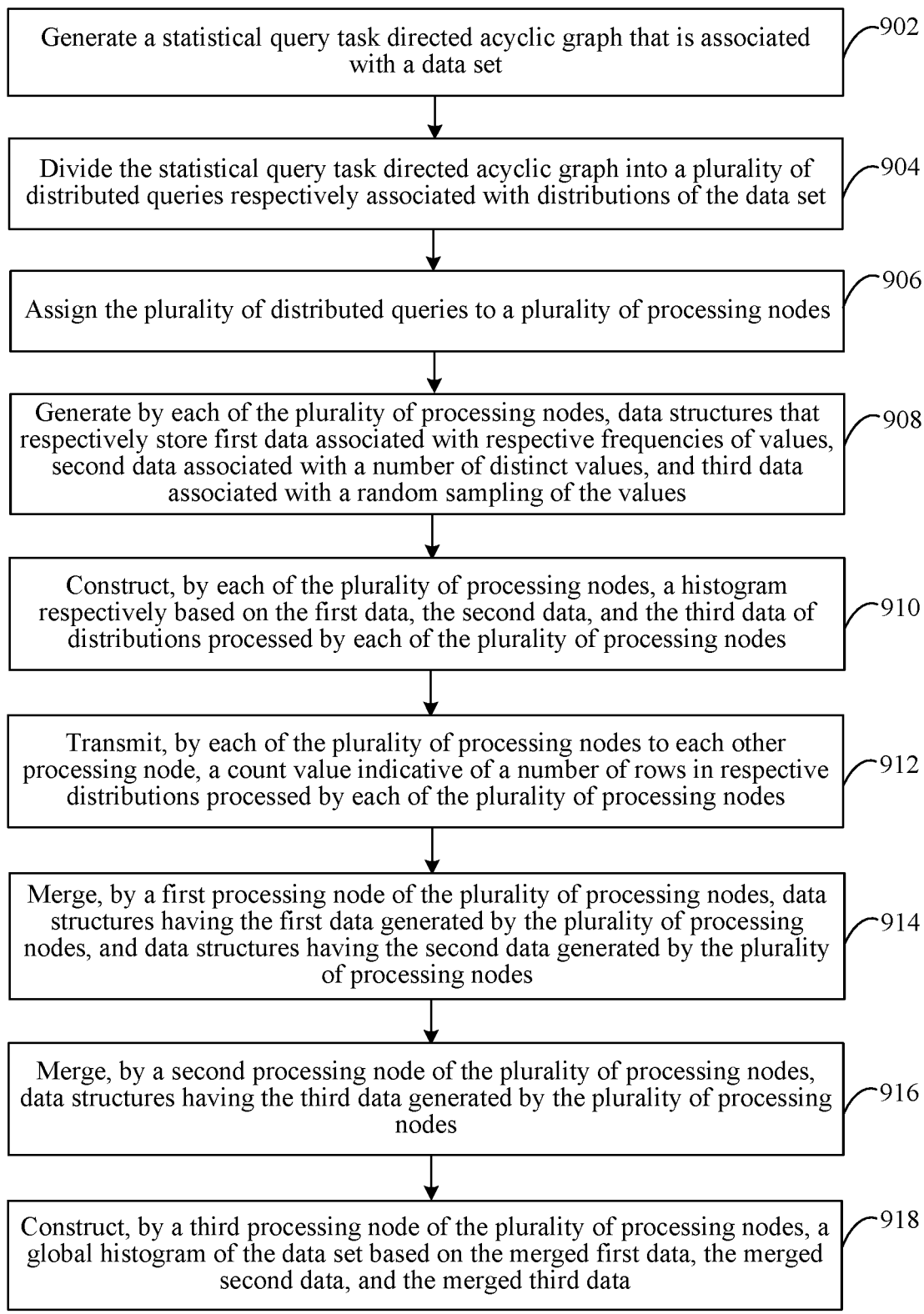
FIG. 9 shows a flowchart for distributed histogram computation in a framework utilizing data stream sketches and samples, in accordance with an example embodiment.

FIG. 9 shows a flowchart 900 for distributed histogram computation in a framework utilizing data stream sketches and samples, in accordance with an example embodiment. Further structural and operational examples will be apparent to persons skilled in the relevant art(s) based on the following descriptions. Flowchart 900 may be performed to generate a global histogram for a data set, according to embodiments, without performing a sort of the data in the data set. Flowchart 900 is described as follows with respect to system 200 of FIG. 2 and system 300 of FIG. 3, as well as flow diagram 700 of FIG. 7 and flow diagram 800 of FIG. 8.

In embodiments, step 902, step 904, and/or step 906 are performed by a control node, such as system 200 of FIG. 2 and/or distributed query processor 208 in flow diagram 700 of FIG. 7.

Flowchart 900 begins at step 902. In step 902, a statistical query task directed acyclic graph (DAG) that is associated with a data set is generated. For instance, as described herein with respect to FIGS. 2 and 7, deserializer 212 may be configured to deserialize requests for distributed statistics computation on data sets and/or distributions, received from DB server 210, and provide its output to DAG generator 214 which in turn is configured to generate a DAG, such as a statistical query task DAG used to construct histograms, according to embodiments. A statistical query task DAG as shown in flow diagram 800 may be generated in step 902.

In step 904, the statistical query task directed acyclic graph is divided into a plurality of distributed queries respectively associated with distributions of the data set. For example, the statistical query task DAG generated in step 902 above is divided by workload manager 216 of distributed query processor 208 for assignment to one or more compute nodes as shown in flow diagram 700 and embodied by system 300 of FIG. 3.

In step 906, the plurality of distributed queries is assigned to a plurality of processing nodes. For instance, workload manager 216 of distributed query processor 208 is configured to assign the divided portions of the statistical query task DAG, with respect to distributions of the data set, across compute node 716*a* to compute node 716*n* for distributed processing of the statistical query task DAG in determining a global histogram for the data set.

In embodiments, step 908, step 910, 912, 914, and/or step 916 are performed by a plurality of compute nodes, such as system 300 of FIG. 3 and/or compute node 716*a* through compute node 716*n* in flow diagram 700 of FIG. 7 for distributed processing of the statistical query task DAG represented in FIG. 8. One or more of step 908, step 910, 912, 914, and/or step 916 are performed in parallel or at least partially in parallel, with each other by one or more of compute node 716*a* through compute node 716*n*.

In step 908, data structures that respectively store first data associated with respective frequencies of values, second data associated with a number of distinct values, and third data associated with a random sampling of the values are generated by each of the plurality of processing nodes. For example, compute node 716*a* through compute node 716*n*, which are assigned to portions of the divided statistical query task DAG in step 906 by the control node, are configured to generate data structures that respectively store first data associated with respective frequencies of values, second data associated with a number of distinct values, and third data associated with a random sampling of the values of the distributions of the data set corresponding to each of compute node 716*a* through compute node 716*n*. Such data structures and data may correspond to those described in FIGS. 4, 5, and/or 6 above. In embodiments, step 908 may correspond to step 802 of FIG. 8, and may performed in whole or in part by statistics manager 312 of system 300 in FIG. 3.

In step 910, a histogram respectively based on the first data, the second data, and the third data of distributions processed by each of the plurality of processing nodes is constructed by each of the plurality of processing nodes. For instance, compute node 716*a* through compute node 716*n* may each be configured to generate a local histogram for their respective distributions based on the first data, the second data, and the third data, as described herein, without performing a sort of data in the respective distributions. In embodiments, step 910 may correspond to step 802 of FIG. 8, and may performed in whole or in part by statistics manager 312 of system 300 in FIG. 3.

In step 912, a count value indicative of a number of rows in respective distributions processed by each of the plurality of processing nodes is transmitted by each of the plurality of processing nodes to each other processing node. That is, each assigned compute node of compute node 716*a* through compute node 716*n* provides its respective row count to each other compute node to be used in later query processing. In embodiments, step 912 may correspond to step 804 of FIG. 8, and may performed in whole or in part by statistics manager 312 and/or data transmitter 316 of system 300 in FIG. 3.

In step 914, data structures having the first data generated by the plurality of processing nodes and data structures having the second data generated by the plurality of processing nodes are merged by a first processing node of the plurality of processing nodes. For example, in embodiments, one of compute node 716*a* through compute node 716*n* may be assigned by workload manager 216 to perform the merging in step 914 for the first data and for the second data. Merging the first data and merging the second data from each compute node distribution provides a single set of merged first data and merged second data that is utilized in constructing a global histogram for the entire data set. In embodiments, step 914 may correspond to step 806 of FIG. 8, and may performed in whole or in part by sketch merger 318 of system 300 in FIG. 3.

In step 916, data structures having the third data generated by the plurality of processing nodes are merged by a second processing node of the plurality of processing nodes. For instance, one of compute node 716*a* through compute node 716*n* may be assigned by workload manager 216 to perform the merging in step 916 for the third data. Merging the third data from each compute node distribution provides a single set of merged third data that is utilized in constructing a global histogram for the entire data set. In embodiments, step 916 may correspond to step 808 of FIG. 8, and may performed in whole or in part by sample merger 320 of system 300 in FIG. 3.

In step 918, a global histogram of the data set is constructed by a third processing node of the plurality of processing nodes based on the merged first data, the merged second data, and the merged third data. For instance, one of compute node 716*a* through compute node 716*n* may be assigned by workload manager 216 to perform, and may be configured to perform, construction of a global histogram for the entire data set, represented by all of the distributions, based on the merged first data, the merged second data, and the merged third data, as described herein. In embodiments, step 916 may correspond to step 810 of FIG. 8. The global histogram constructed in step 918 is deployed to query optimizer 222 of DB server 210 of system 200 in FIG. 2 for generation of query plans for incoming queries against data sets utilizing the cardinality estimation from the constructed, global histogram, according to embodiments.

In embodiments, the same processing/compute node of compute node 716*a* through compute node 716*n* may perform step 914, step 916, and/or step 918.

Figure 10:
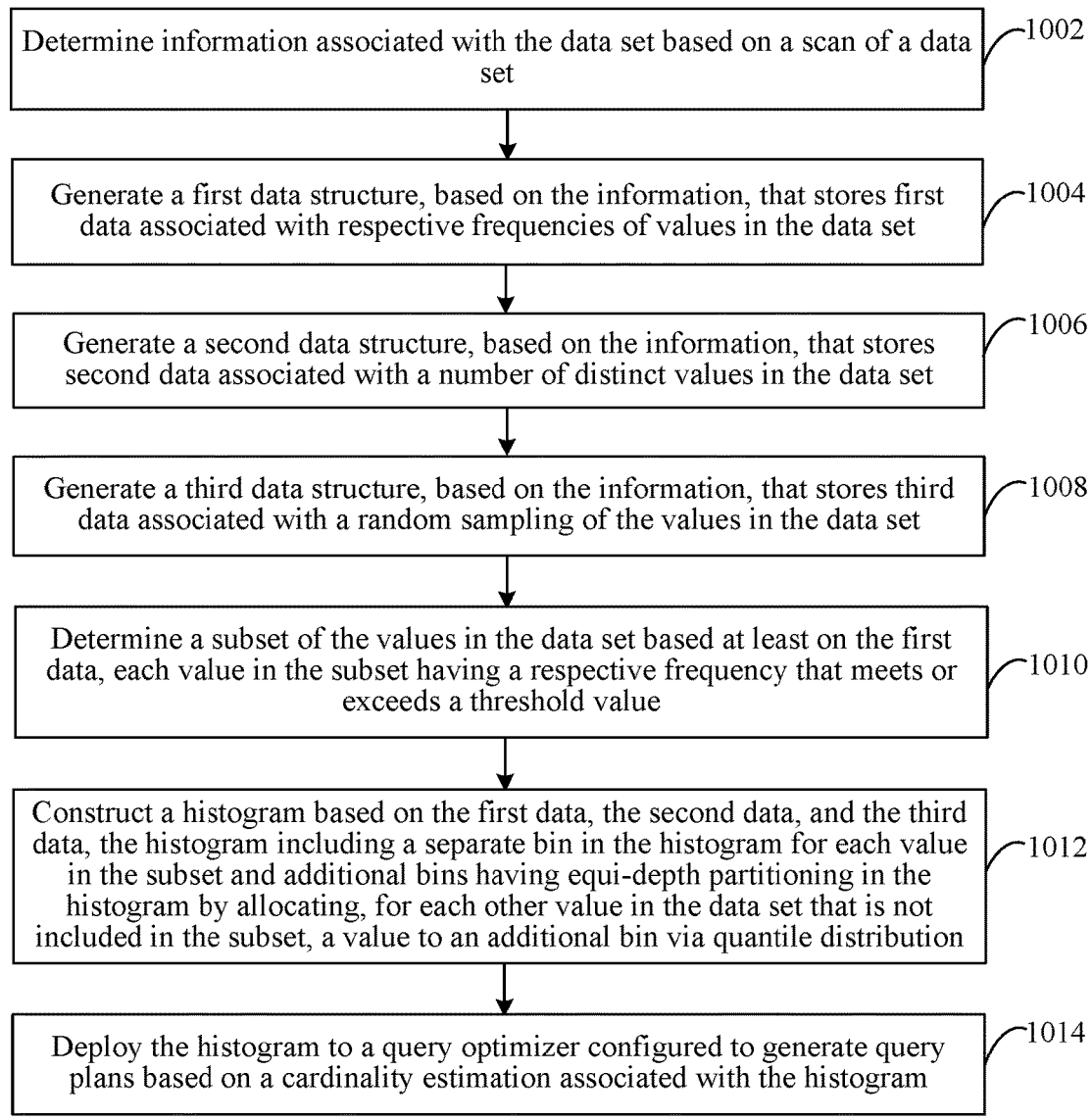
FIG. 10 shows a flowchart for distributed histogram computation in a framework utilizing data stream sketches and samples, in accordance with an example embodiment.

FIG. 10 shows a flowchart 1000 for distributed histogram computation in a framework utilizing data stream sketches and samples, in accordance with an example embodiment. Further structural and operational examples will be apparent to persons skilled in the relevant art(s) based on the following descriptions. Flowchart 1000 may be performed to generate a local histogram for a distribution(s) of a data set, according to embodiments, without performing a sort of the data in the distribution. Flowchart 1000 is described as follows with respect to system 300 of FIG. 3, as well as data structure 400 of FIG. 4, data structure 500 of FIG. 5, and data structure 600 of FIG. 6.

Flowchart 1000 begins at step 1002. In step 1002, information associated with the data set is determined based on a scan of a data set. For example, DB server 308 of system 300 in FIG. 3 is configured to determine data set/distribution information by scanning the data therein, e.g., via DDL engine 310 and/or statistics manager 312. DB server 308 is configured to scan rows and/or columns of data of a data set/distribution. During a scan of data, data structures may be generated and updated with the information determined in the scan as described below.

In step 1004, a first data structure is generated, based on the information, that stores first data associated with respective frequencies of values in the data set. For instance, DB server 308, e.g., via DDL engine 310 and/or statistics manager 312, is configured to generate a first data structure that stores information related to frequencies of values in the data set/distribution, as described above for data structure 400 in FIG. 4.

In step 1006, a second data structure is generated, based on the information, that stores second data associated with a number of distinct values in the data set. For example, DB server 308, e.g., via DDL engine 310 and/or statistics manager 312, is configured to generate a second data structure that stores information related to a number of distinct, or unique, values in the data set/distribution, as described above for data structure 500 in FIG. 5.

In step 1008, a third data structure is generated, based on the information, that stores third data associated with a random sampling of the values in the data set. For instance, DB server 308, e.g., via DDL engine 310 and/or statistics manager 312, is configured to generate a third data structure that stores information related to a random sample of values in the data set/distribution, as described above for data structure 600 in FIG. 6.

In step 1010, a subset of the values in the data set is determined based at least on the first data, each value in the subset having a respective frequency that meets or exceeds a threshold value. In embodiments, DB server 308, e.g., via DDL engine 310 and/or statistics manager 312, is configured to determine one or more heavy-hitter values, i.e., values in the data set/distribution that repeat with a very high frequency, where this frequency is represented by the threshold value. That is, when a value is repeated in a data set/distribution a specified number of times, it is considered to be a very high frequency value, and is placed in its own bin as noted herein. In embodiments, the third data associated with a random sampling of the values in the data set, as described above in step 1008, is also used to determine the subset of the values in step 1010, i.e., for determining values in the data set/distribution that repeat with a very high frequency.

In step 1012, a histogram is constructed based on the first data, the second data, and the third data, the histogram including a separate bin in the histogram for each value in the subset and additional bins having equi-depth partitioning in the histogram by allocating, for each other value in the data set that is not included in the subset, a value to an additional bin via quantile distribution. For example, a local histogram for the distribution may be constructed in step 1012 by statistics manager 312.

In step 1014, the histogram is deployed to a query optimizer configured to generate query plans based on a cardinality estimation associated with the histogram. For instance, the local histogram constructed in step 1012 by statistics manager 312 is deployed to query optimizer 314 of DB server 308 of system 300 in FIG. 3 to generate query plans for incoming queries against distributions of data sets utilizing the cardinality estimation from the constructed, local histogram.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1, system 200 in FIG. 2, and system 300 of FIG. 3, along with any components and/or subcomponents thereof, as well any data structures, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
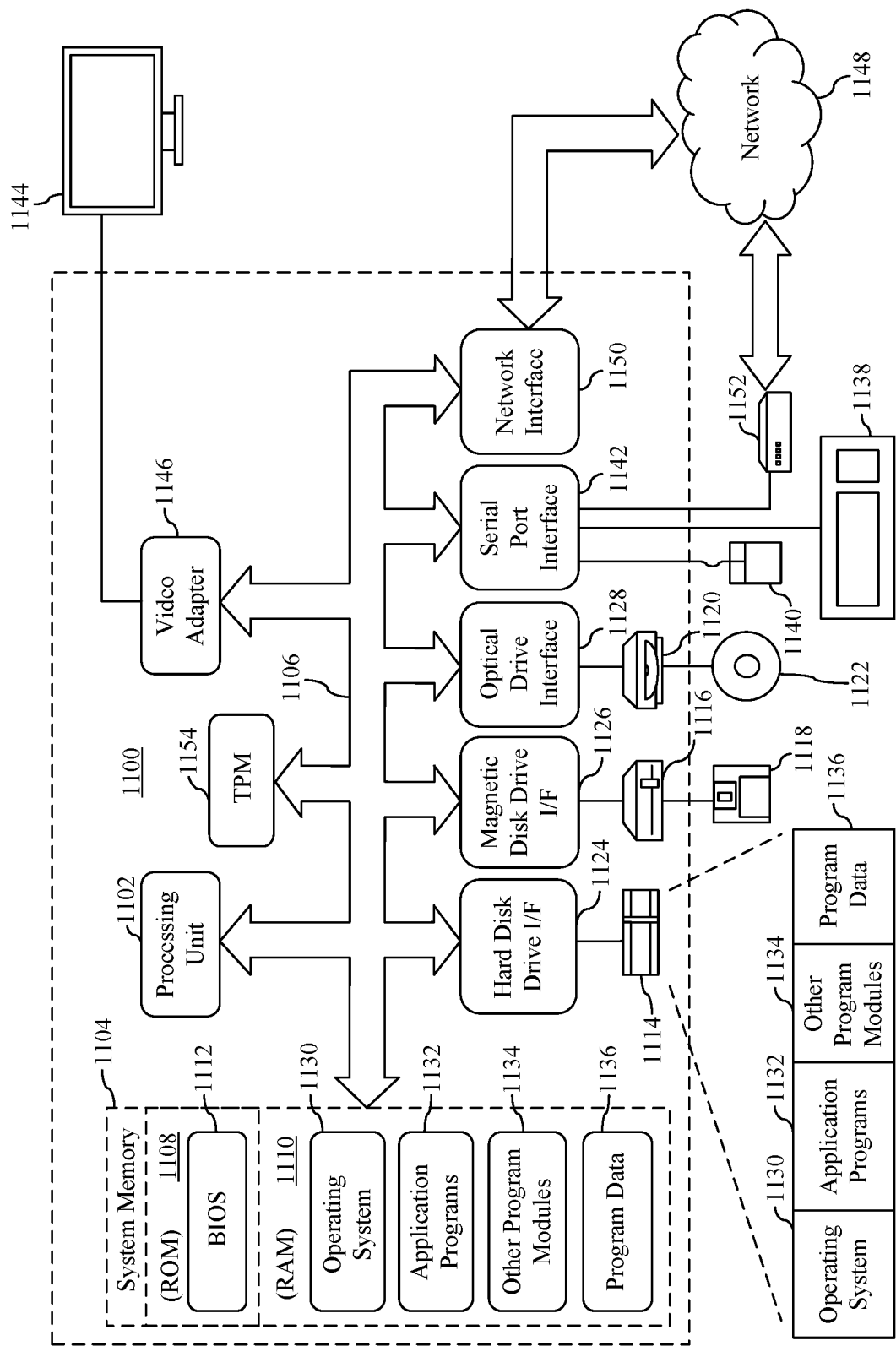
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices or systems similar to computing device 1100, or multiple instances of computing device 1100, in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, servers, and/or clusters, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 in FIG. 1, system 200 in FIG. 2, and system 300 of FIG. 3, along with any components and/or subcomponents thereof, as well any data structures, and operations of the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

TPM 1154 may be connected to bus 1106, and may be an embodiment of any TPM, as would be understood by one of skill in the relevant art(s) having the benefit of this disclosure. For example, TPM 1154 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for distributed histogram computation in a framework utilizing data stream sketches and samples. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein enable the speed of statistics collection during a scan of the underlying data to be high, while the memory footprint remains low, which in cases of multiple threads scanning data in parallel, allows for processing efficiency while still utilizing the types of statistics described herein. That is, the collection speed and low memory footprint achieved through the described embodiments, is not achievable using other types of statistics. Additionally, embodiments herein enable fast histogram construction, including when additional data partitions are brought online incrementally, without full (re-)scanning of the data. In other words, the statistics utilized in embodiments are incrementally mergeable where the union of the statistics built separately on two data sets has equivalent accuracy to the similar statistic built on the union of the two data sets. Moreover, as not all histogram types can readily be computed based on the types of statistics herein, e.g., MaxDiff(V,F) histograms cannot accurately be computed in this manner, the embodiments herein also provide for the generation of hybrid histogram variants that are supported by streaming statistics, yet still retain comparable end-to-end performance as existing histograms used in prior implementations of DB Servers. That is, the embodiments herein utilize a unique combination of data stream sketches and samples for distributed histogram computation at the global and distribution levels of database systems that provide for robust query plans based on generated histograms as well as resource efficiencies that were previously not available for software-based services, query hosts, or data warehouses, much less for the specific embodiments described herein.

The additional examples and embodiments described in this Section may be applicable to examples disclosed in any other Section or subsection of this disclosure.

Embodiments in this description provide for systems, devices, and methods for distributed histogram computation in a framework utilizing data stream sketches and samples. For instance, a system is described herein. The system is enabled and configured for distributed histogram computation in a framework utilizing data stream sketches and samples, according to embodiments. The system includes a control node and a plurality of processing nodes. The control node is configured to generate a statistical query task directed acyclic graph that is associated with a data set, and to assign a plurality of distributed queries, respectively associated with distributions of the data set and generated by dividing the statistical query task directed acyclic graph, to a plurality of processing nodes. The plurality of processing nodes, one or more of which, at least partially in parallel for each distribution respectively, are configured to generate by each of the plurality of processing nodes, data structures that respectively store first data associated with respective frequencies of values, second data associated with a number of distinct values, and third data associated with a random sampling of the values, and to construct, by each of the plurality of processing nodes, a histogram respectively based on the first data, the second data, and the third data of distributions processed by said each of the plurality of processing nodes. A first processing node of the plurality of processing nodes is configured to merge the first data generated by the plurality of processing nodes, and the second data generated by the plurality of processing nodes, and a second processing node of the plurality of processing nodes is configured to merge the third data generated by the plurality of processing nodes. A third processing node of the plurality of processing nodes configured to construct a global histogram of the data set based on the merged first data, the merged second data, and the merged third data.

In an embodiment of the system, the plurality of processing nodes, one or more of which, at least partially in parallel on each distribution respectively, are configured to transmit, by each of the plurality of processing nodes to each other processing node and subsequent to said constructing, a count value indicative of a number of rows in respective distributions processed by each of the plurality of processing nodes.

In an embodiment of the system, the first processing node, the second processing node, and the third processing node are a same processing node.

In an embodiment of the system, the control node, subsequent to said constructing the global histogram, is configured to generate a query plan, having a cardinality estimate based at least on the global histogram, of an incoming query directed to the data set, generate a plurality of distributed queries respectively associated with distributions of the data set based at least on the incoming query and the estimated cardinality, assign the plurality of distributed queries to one or more of the plurality of processing nodes, and return a query result based on performance of the plurality of distributed queries.

In an embodiment of the system, the control node is configured to receive the incoming query prior to constructing the global histogram.

In an embodiment of the system, constructing the global histogram is performed without sorting the data set and is not based on sorting the data set.

In an embodiment of the system, the plurality of processing nodes, one or more of which, at least partially in parallel for each distribution respectively, and to construct the histogram, are configured to determine a subset of values in the distribution based at least on the first data, each value in the subset having a respective frequency that meets or exceeds a threshold value, and to construct the histogram as including a separate bin in the histogram for each value in the subset and as including additional bins having equi-depth partitioning in the histogram by allocating, for each other value in the distribution that is not included in the subset, a value to an additional bin via quantile distribution.

A method performed by a computing system is also described herein. The method is for distributed histogram computation in a framework utilizing data stream sketches and samples, according to embodiments. The method includes, performing by a control node, generating a statistical query task directed acyclic graph associated with a data set, dividing the statistical query task directed acyclic graph into a plurality of distributed queries respectively associated with distributions of the data set, and assigning the plurality of distributed queries to a plurality of processing nodes. The method also includes performing, at least partially in parallel, by one or more of the plurality of processing nodes on each distribution, generating by each of the plurality of processing nodes, data structures that respectively store first data associated with respective frequencies of values, second data associated with a number of distinct values, and third data associated with a random sampling of the values, constructing, by each of the plurality of processing nodes, a histogram respectively based on the first data, the second data, and the third data of distributions processed by each of the plurality of processing nodes, transmitting, by each of the plurality of processing nodes to each other processing node, a count value indicative of a number of rows in respective distributions processed by each of the plurality of processing nodes, merging, by a first processing node of the plurality of processing nodes, data structures having the first data generated by the plurality of processing nodes, and data structures having the second data generated by the plurality of processing nodes, and merging, by a second processing node of the plurality of processing nodes, data structures having the third data generated by the plurality of processing nodes. The method further includes constructing, by a third processing node of the plurality of processing nodes, a global histogram of the data set based on the merged first data, the merged second data, and the merged third data.

In an embodiment of the method, the first processing node, the second processing node, and the third processing node are a same processing node.

In an embodiment, the method further includes subsequent to said constructing the global histogram, performing by the control node, generating a query plan, having a cardinality estimate based at least on the global histogram, of an incoming query directed to the data set, and generating a plurality of distributed queries respectively associated with a distribution of the data set based at least on the incoming query and the estimated cardinality.

In an embodiment, the method further includes subsequent to said generating the plurality of distributed queries respectively associated with the distribution of the data set, performing by the control node assigning the plurality of distributed queries to one or more of the plurality of processing nodes, and returning a query result based on performance of the plurality of distributed queries.

In an embodiment, the method further includes receiving the incoming query prior to constructing the global histogram.

In an embodiment of the method, constructing the global histogram is performed without sorting the data set and is not based on sorting the data set.

Another method performed by a computing system is also described herein. The method is for distributed histogram computation in a framework utilizing data stream sketches and samples, according to embodiments. The method includes, performing a histogram construction by determining information associated with the data set based on a scan of a data set, generating a first data structure, based on the information, that stores first data associated with respective frequencies of values in the data set, generating a second data structure, based on the information, that stores second data associated with a number of distinct values in the data set, generating a third data structure, based on the information, that stores third data associated with a random sampling of the values in the data set, and constructing a histogram based on the first data, the second data, and the third data. The method also includes deploying the histogram to a query optimizer configured to generate query plans based on a cardinality estimation associated with the histogram.

In an embodiment of the method, constructing the histogram is performed without sorting the data set and is not based on sorting the data set.

In an embodiment, the method further includes determining a subset of the values in the data set based on the first data, each value in the subset having a respective frequency that meets or exceeds a threshold value, and constructing the histogram comprises including a separate bin in the histogram for each value in the subset.

In an embodiment, the method further includes constructing additional bins having equi-depth partitioning in the histogram by allocating, for each other value in the data set that is not included in the subset, a value to an additional bin via quantile distribution.

In an embodiment of the method, the data set comprises one of a plurality of distributions of a larger data set, the histogram construction is performed for each one of the plurality of distributions, and the cardinality estimation is of the larger data set and is also based on the histograms of each other one of the plurality of distributions.

In an embodiment of the method, the first data structure represents a count-min sketch, the second data structure represents a hyperloglog sketch, and the third data structure represents a list of data values from the data set and respective associated random number values.

In an embodiment of the method, subsequent to said constructing the histogram, additional data is added to the data set, the method further includes determining additional information associated with the additional data based on a scan of the additional data, generating a fourth data structure, based on the additional information, that stores fourth data associated with respective frequencies of values in the additional data, generating a fifth data structure, based on the additional information, that stores fifth data associated with a number of distinct values in the additional data, generating a sixth data structure, based on the additional information, that stores sixth data associated with a random sampling of the values in the additional data, merging the first data structure with the fourth data structure, the second data structure with the fifth data structure, and the third data structure with the sixth data structure, constructing an updated histogram based on said merging, and deploying an updated cardinality estimation of the data set, based on the updated histogram, to the query optimizer.

Embodiments herein also provide for a computer-readable storage medium that stores program instructions that, when executed by one or more processing devices, performs a method for distributed histogram computation in a framework utilizing data stream sketches and samples as described herein.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a control node that is hardware-based and that is configured to:
generate a statistical query task directed acyclic graph that is associated with a data set; and
assign a plurality of distributed queries, respectively associated with distributions of the data set and generated by dividing the statistical query task directed acyclic graph, to a plurality of processing nodes that are hardware-based;
the plurality of processing nodes, one or more of which, at least partially in parallel for each distribution respectively, are configured to:

generate by each of the plurality of processing nodes, data structures that respectively store first data associated with respective frequencies of values, second data associated with a number of distinct values, and third data associated with a random sampling of the values;

construct, by each of the plurality of processing nodes, a histogram respectively based on the first data, the second data, and the third data of distributions processed by said each of the plurality of processing nodes;

merge, by a first processing node of the plurality of processing nodes, the first data generated by the plurality of processing nodes, and the second data generated by the plurality of processing nodes; and merge, by a second processing node of the plurality of processing nodes, the third data generated by the plurality of processing nodes; and a third processing node of the plurality of processing nodes configured to construct a global histogram of the data set based on the merged first data, the merged second data, and the merged third data.

2. The system of claim 1, wherein the plurality of processing nodes, one or more of which, at least partially in parallel on each distribution respectively, are configured to:

transmit, by each of the plurality of processing nodes to each other processing node and subsequent to said constructing, a count value indicative of a number of rows in respective distributions processed by each of the plurality of processing nodes.

3. The system of claim 1, wherein the first processing node, the second processing node, and the third processing node are a same processing node.

4. The system of claim 1, wherein the control node, subsequent to said constructing the global histogram, is configured to:

generate a query plan, having a cardinality estimate based at least on the global histogram, of an incoming query directed to the data set;

generate a plurality of distributed queries respectively associated with distributions of the data set based at least on the incoming query and the estimated cardinality;

assign the plurality of distributed queries to one or more of the plurality of processing nodes; and return a query result based on performance of the plurality of distributed queries.

5. The system of claim 4, wherein the control node is configured to:

receive the incoming query prior to said constructing the global histogram.

6. The system of claim 1, wherein constructing the global histogram is performed without sorting the data set and is not based on sorting the data set.

7. The system of claim 1, wherein the plurality of processing nodes, one or more of which, at least partially in parallel for each distribution respectively, and to construct the histogram, are configured to:

determine a subset of values in the distribution based at least on the first data, each value in the subset having a respective frequency that meets or exceeds a threshold value; and construct the histogram as including a separate bin in the histogram for each value in the subset and as including additional bins having equi-depth partitioning in the histogram by allocating, for each other value in the distribution that is not included in the subset, a value to an additional bin via quantile distribution.

8. A method performed by a computing system, the method comprising:

performing by a control node:

generating a statistical query task directed acyclic graph associated with a data set;

dividing the statistical query task directed acyclic graph into a plurality of distributed queries respectively associated with distributions of the data set; and assigning the plurality of distributed queries to a plurality of processing nodes;

performing, at least partially in parallel, by one or more of the plurality of processing nodes on each distribution:

generating by each of the plurality of processing nodes, data structures that respectively store first data associated with respective frequencies of values, second data associated with a number of distinct values, and third data associated with a random sampling of the values;

constructing, by each of the plurality of processing nodes, a histogram respectively based on the first data, the second data, and the third data of distributions processed by each of the plurality of processing nodes;

transmitting, by each of the plurality of processing nodes to each other processing node, a count value indicative of a number of rows in respective distributions processed by each of the plurality of processing nodes;

merging, by a first processing node of the plurality of processing nodes, data structures having the first data generated by the plurality of processing nodes, and data structures having the second data generated by the plurality of processing nodes; and merging, by a second processing node of the plurality of processing nodes, data structures having the third data generated by the plurality of processing nodes; and constructing, by a third processing node of the plurality of processing nodes, a global histogram of the data set based on the merged first data, the merged second data, and the merged third data.

9. The method of claim 8, wherein the first processing node, the second processing node, and the third processing node are a same processing node.

10. The method of claim 8, further comprising:

subsequent to said constructing the global histogram, performing by the control node:

generating a query plan, having a cardinality estimate based at least on the global histogram, of an incoming query directed to the data set; and generating a plurality of distributed queries respectively associated with a distribution of the data set based at least on the incoming query and the estimated cardinality.

11. The method of claim 10, further comprising:

subsequent to said generating the plurality of distributed queries respectively associated with the distribution of the data set, performing by the control node:

assigning the plurality of distributed queries to one or more of the plurality of processing nodes; and returning a query result based on performance of the plurality of distributed queries.

12. The method of claim 10, further comprising:

receiving the incoming query prior to said constructing the global histogram.

13. The method of claim 8, wherein constructing the global histogram is performed without sorting the data set and is not based on sorting the data set.

14. A method performed by a computing system, the method comprising:
performing a construction of a histogram by:
determining information associated with the data set based on a scan of a data set;
generating a first data structure, based on the information, that stores first data associated with respective frequencies of values in the data set;
generating a second data structure, based on the information, that stores second data associated with a number of distinct values in the data set;
generating a third data structure, based on the information, that stores third data associated with a random sampling of the values in the data set; and
constructing the histogram based on the first data, the second data, and the third data; and
deploying the histogram to a query optimizer configured to generate query plans based on a cardinality estimation associated with the histogram.

15. The method of claim 14, wherein constructing the histogram is performed without sorting the data set and is not based on sorting the data set.

16. The method of claim 14, further comprising:
determining a subset of the values in the data set based on the first data, each value in the subset having a respective frequency that meets or exceeds a threshold value;
wherein constructing the histogram comprises including a separate bin in the histogram for each value in the subset.

17. The method of claim 16, further comprising:
constructing additional bins having equi-depth partitioning in the histogram by allocating, for each other value in the data set that is not included in the subset, a value to an additional bin via quantile distribution.

18. The method of claim 14, wherein the data set comprises one of a plurality of distributions of a larger data set;
wherein said performing the construction of the histogram is performed for each one of the plurality of distributions; and
wherein the cardinality estimation is of the larger data set and is also based on the histograms of each other one of the plurality of distributions.

19. The method of claim 14, wherein the first data structure represents a count-min sketch, the second data structure represents a hyperloglog sketch, and the third data structure represents a list of data values from the data set and respective associated random number values.

20. The method of claim 14, wherein, subsequent to said constructing the histogram, additional data is added to the data set;
the method further comprising:
determining additional information associated with the additional data based on a scan of the additional data;
generating a fourth data structure, based on the additional information, that stores fourth data associated with respective frequencies of values in the additional data;
generating a fifth data structure, based on the additional information, that stores fifth data associated with a number of distinct values in the additional data;
generating a sixth data structure, based on the additional information, that stores sixth data associated with a random sampling of the values in the additional data;
merging the first data structure with the fourth data structure, the second data structure with the fifth data structure, and the third data structure with the sixth data structure;
constructing an updated histogram based on said merging; and
deploying an updated cardinality estimation of the data set, based on the updated histogram, to the query optimizer.

* * * * *